(12) United States Patent
Kakimaru

(10) Patent No.: US 11,973,922 B2
(45) Date of Patent: Apr. 30, 2024

(54) VEHICULAR TRAVEL-ENVIRONMENT DISPLAY APPARATUS

(71) Applicant: SUBARU CORPORATION, Tokyo (JP)

(72) Inventor: Ryosuke Kakimaru, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 261 days.

(21) Appl. No.: 17/487,958

(22) Filed: Sep. 28, 2021

(65) Prior Publication Data

US 2022/0116574 A1    Apr. 14, 2022

(30) Foreign Application Priority Data

Oct. 13, 2020   (JP) ................. 2020-172344

(51) Int. Cl.
*H04N 13/111* (2018.01)
*B60K 35/00* (2006.01)
*G08G 1/16* (2006.01)
*H04N 13/296* (2018.01)
*B60R 1/00* (2022.01)

(52) U.S. Cl.
CPC ........... *H04N 13/111* (2018.05); *B60K 35/00* (2013.01); *G08G 1/167* (2013.01); *H04N 13/296* (2018.05); *B60K 2370/168* (2019.05); *B60R 1/00* (2013.01); *B60R 2300/607* (2013.01); *H04N 2213/002* (2013.01)

(58) Field of Classification Search
CPC .............. H04N 13/111; H04N 13/296; H04N 2213/002; B60K 35/00; B60K 2370/168; G08G 1/167
See application file for complete search history.

(56) References Cited

U.S. PATENT DOCUMENTS

| 2018/0229770 A1* | 8/2018 | Kataoka ................. B62D 1/286 |
| 2018/0286095 A1 | 10/2018 | Kusayanagi et al. |
| 2023/0005374 A1* | 1/2023 | Elimaleh .............. G08G 1/0141 |

FOREIGN PATENT DOCUMENTS

| JP | WO2017/061230 A1 | 9/2018 |
| JP | 2019-053008 A | 4/2019 |

* cited by examiner

*Primary Examiner* — Sing-Wai Wu
(74) *Attorney, Agent, or Firm* — MCGINN I.P. LAW GROUP, PLLC

(57) ABSTRACT

A travel-environment display apparatus includes a generating unit that repeatedly generates a travel-environment image of a vehicle, and a display device that updates display in accordance with the travel-environment images. The generating unit generates an image including a vehicle object corresponding to the vehicle as viewed from a rear viewpoint and a linear road-surface object extending distantly from the vehicle object to correspond to a road, lane, or lane boundary line along which the vehicle is traveling. The generating unit also moves the vehicle object between two lanes expressed by the linear road-surface object between the travel-environment images, and changes an orientation of the linear road-surface object such that a far area thereof from the viewpoint significantly moves toward an opposite side from a lane-changing direction of the vehicle, as compared with a near area, and then moves back, when the vehicle performs a lane change between the two lanes.

7 Claims, 10 Drawing Sheets

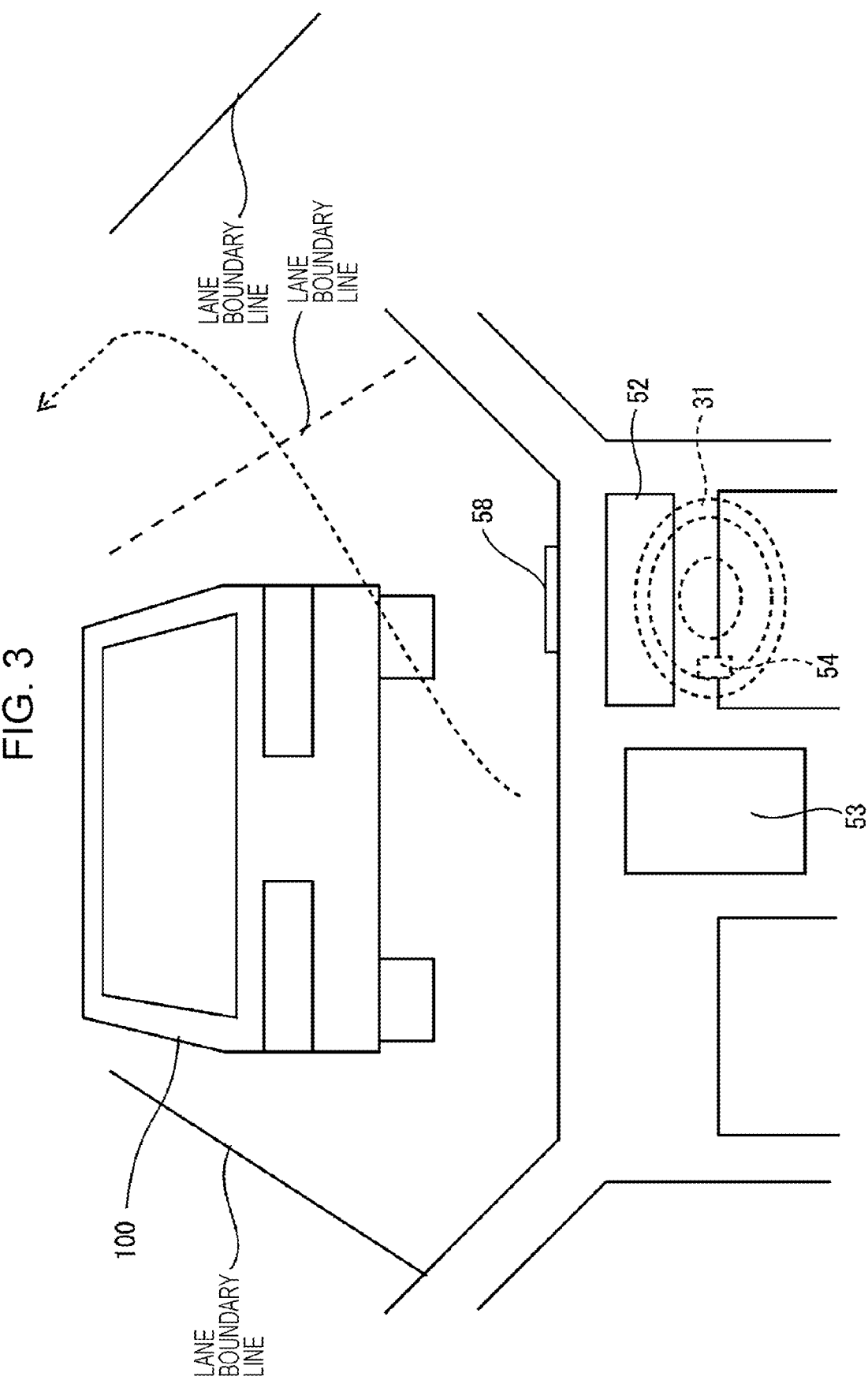

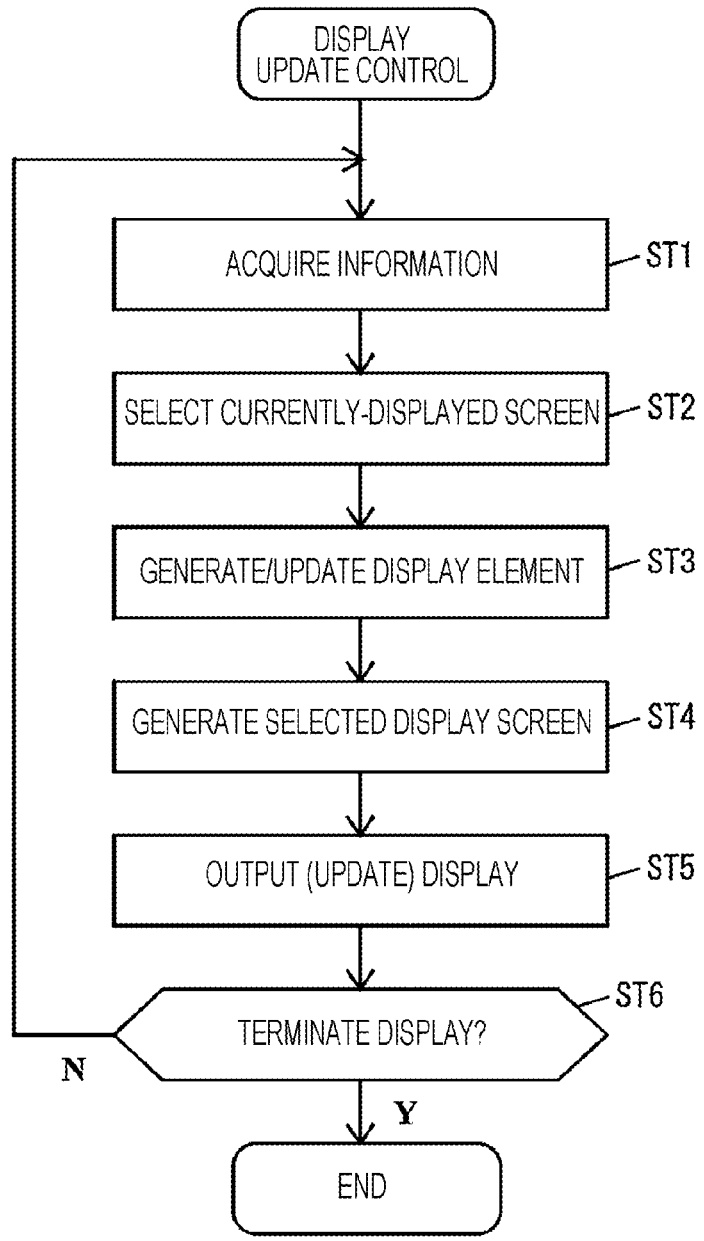

VEHICULAR TRAVEL-ENVIRONMENT DISPLAY APPARATUS

CROSS-REFERENCE TO RELATED APPLICATIONS

The present application claims priority from Japanese Patent Application No. 2020-172344 filed on Oct. 13, 2020, the entire contents of which are hereby incorporated by reference.

BACKGROUND

The disclosure relates to vehicular travel-environment display apparatuses.

A known automobile displays an image of the automobile and the surrounding road surface as a travel environment of the surrounding area in which the automobile is traveling. For example, see International Patent Application Publication WO 2017-061230 A1 and Japanese Unexamined Patent Application Publication (JP-A) No. 2019-053008.

In WO 2017-061230 A1, when the automobile is to perform a lane change between two lanes, an upper-rear viewpoint serving as reference for the image is moved from the upper rear side of the automobile on the original lane prior to the lane change to the upper rear side of a lane boundary line to be passed over during the lane change, and is further moved to the upper rear side of the automobile on the new lane after the lane change.

In JP-A No. 2019-053008, when the automobile is to perform a lane change between two lanes, the orientation of the automobile is changed in the image, and a plurality of lane boundary lines displayed using a single-vanishing-point projection technique are rotated around a vanishing point toward the opposite side from the lane-changing direction.

Each of these displayed images is an image in which the movement of the automobile changing lanes in the image mimics the actual movement during the lane change, and is similar to a bird's-eye-view image of the automobile and the surrounding road surface as viewed down from the upper rear side as well as a bird's-eye-view image of the automobile and the surrounding road surface as viewed down from directly above in that the vehicle occupant is less likely to feel a sense of discomfort with respect to the movement of the automobile changing lanes in the image.

SUMMARY

An aspect of the disclosure provides a vehicular travel-environment display apparatus to be applied to a vehicle. The vehicular travel-environment display apparatus includes a generating unit and a display device. The generating unit is configured to generate travel-environment images of the vehicle. The display device is configured to update display in accordance with the travel-environment images of the vehicle generated by the generating unit. The generating unit is configured to generate an image including a vehicle object corresponding to the vehicle as viewed from a rear viewpoint and a linear road-surface object extending distantly from a position of the vehicle object in the image so as to at least correspond to any one of a road, a lane, and a lane boundary line along which the vehicle is traveling. The image is generated as one of the travel-environment images of the vehicle and is a bird's-eye view of the vehicle object as viewed from an upper rear side of the vehicle. The generating unit is configured to move the vehicle object between two lanes expressed by the linear road-surface object between ones of the travel-environment images that are successively generated, and change an orientation of the linear road-surface object such that a far area of the linear road-surface object from the viewpoint significantly moves toward an opposite side from a lane-changing direction of the vehicle, as compared with a near area of the linear road-surface object from the viewpoint, and then moves back, when the vehicle performs a lane change between the two lanes.

An aspect of the disclosure provides a vehicular travel-environment display apparatus to be applied to a vehicle. The vehicular travel-environment display apparatus includes circuitry. The circuitry is configured to repeatedly generate travel-environment images of the vehicle. The circuitry is configured to update display in accordance with the travel-environment images of the vehicle. The circuitry is configured to generate an image including a vehicle object corresponding to the vehicle as viewed from a rear viewpoint and a linear road-surface object extending distantly from a position of the vehicle object in the image so as to at least correspond to any one of a road, a lane, and a lane boundary line along which the vehicle is traveling. The image is generated as one of the travel-environment images of the vehicle and is a bird's-eye view of the vehicle object as viewed from an upper rear side of the vehicle. The circuitry is configured to move the vehicle object between two lanes expressed by the linear road-surface object between ones of the travel-environment images that are successively generated, and change an orientation of the linear road-surface object such that a far area of the linear road-surface object from the viewpoint significantly moves toward an opposite side from a lane-changing direction of the vehicle, as compared with a near area of the linear road-surface object from the viewpoint, and then moves back, when the vehicle performs a lane change between the two lanes.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

FIG. 3 illustrates a visual field of a driver driving the automobile;

FIG. 4 is a flowchart of a display update control process executed by the control system in FIG. 2;

DETAILED DESCRIPTION

Figure 1:
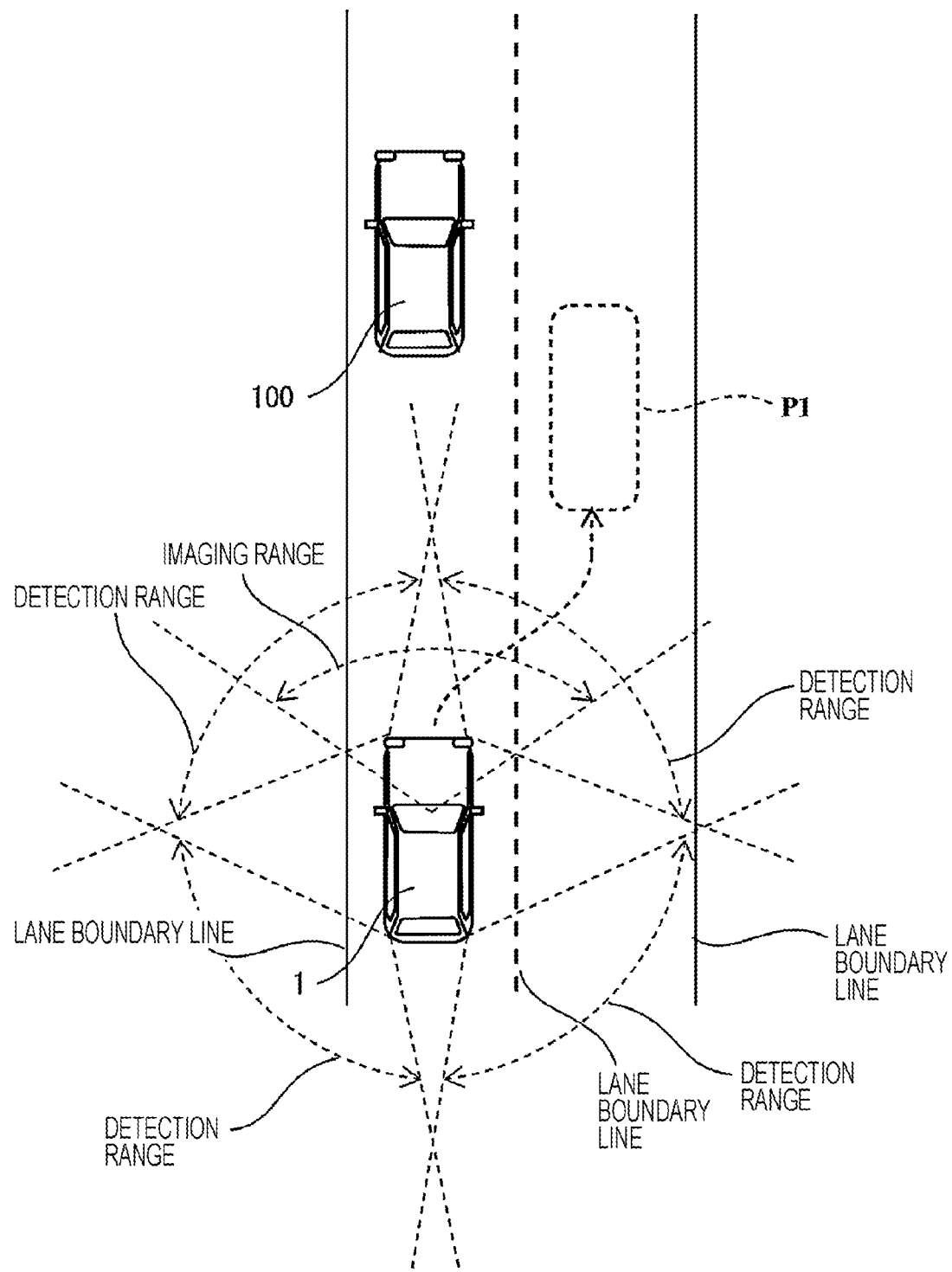
FIG. 1 illustrates an automobile to which a travel-environment display apparatus according to an embodiment of the disclosure is applied.

If a travel-environment image is to be provided to the driver by displaying either of the aforementioned images on, for example, a meter panel provided in front of the driver, there is still a possibility that the driver may not be able to obtain a sense of reality from the image. It may possibly be difficult for the driver to instantaneously determine whether the actual viewable lane change of the automobile outside the automobile matches the lane change on the displayed screen at a glance. The driver may possibly feel a sense of discomfort from the displayed image. For the driver driving the automobile having either one of a driving support function and an automated driving function, it is desirable that the driver ascertain the recognition status in either of the driving support mode and the automated driving mode from the image when there is a sudden change in the travel environment, and that the driver immediately performs an appropriate operation based on comprehensive determination.

For example, in WO 2017-061230 A1, the display position of the automobile in the image moves leftward and rightward in a skipping manner depending on the stage of the lane change. In this case, it is difficult for the driver to visually recognize the automobile at the display position before the lane change starts. There is a possibility that the driver may erroneously recognize that the automobile that is to change lanes in the image is controlled or is traveling as if the automobile is swinging leftward or rightward significantly. Because there is a steering wheel between the meter panel and the driver, the driver may easily recognize slight leftward or rightward movement in the image. A positional change relative to vehicular equipment viewable around the image is easily recognizable. In addition, with the display position of the automobile moving leftward and rightward in the image, the automobile previously viewable before the start of the lane change may possibly be hidden by the vehicular equipment, such as the steering wheel.

In JP-A No. 2019-053008, the display position of the automobile in the image does not move leftward and rightward, but the plurality of lane boundary lines displayed using the single-vanishing-point projection technique rotate around the vanishing point toward the opposite side from the lane-changing direction. When the entire image simply moves leftward and rightward by being rotated around the vanishing point, the automobile that is not moving leftward and rightward may possibly appear to be sliding leftward and rightward to the driver. Furthermore, because the vanishing point is displayed at the center of the upper edge of the image, the entire image views into the distance. In an image that views into the distance, if a balanced state with the actually-viewable scene outside the automobile is to be ensured, it is desirable that objects, such as the automobile and the leading vehicle, be displayed in small sizes. By lowering the upper-rear viewpoint serving as reference for the image to a position near the road surface, such a balanced state with the actually-viewable scene outside the automobile can be ensured by making the automobile larger. In that case, however, the leading vehicle is hidden by the automobile in the image, thus having an adverse effect on the function of the image depicting the travel environment of the surrounding area in which the automobile is traveling.

Depending on a difference between how the movement appears in the image and how the movement of the automobile appears in reality, the driver may easily feel a sense of discomfort in the displayed image, and is to desirably understand the image to eliminate such a sense of discomfort. It may be difficult for the driver to immediately ascertain the recognition status in either of the driving support mode and the automated driving mode from the image, possibly resulting in a delay in the execution of an appropriate operation.

There is still room for improvement in a travel-environment display apparatus that displays a travel-environment image of a vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

FIG. 1 illustrates an automobile 1 to which a travel-environment display apparatus according to an embodiment of the disclosure is applied.

In addition to the automobile 1, FIG. 1 illustrates a two-lane road on which the automobile 1 is traveling, as well as a leading vehicle 100 running ahead of the automobile 1. A plurality of lanes provided on the road are each defined by lane boundary lines painted on the road surface along the left and right sides of the lane.

The automobile 1 is an example of a vehicle.

The automobile 1 traveling on one of the lanes of the two-lane road in this manner may sometimes change to the neighboring lane by passing over the corresponding lane boundary line. The automobile 1 in FIG. 1 may sometimes change lanes such as to move to a position P1 on the neighboring lane.

Figure 2:
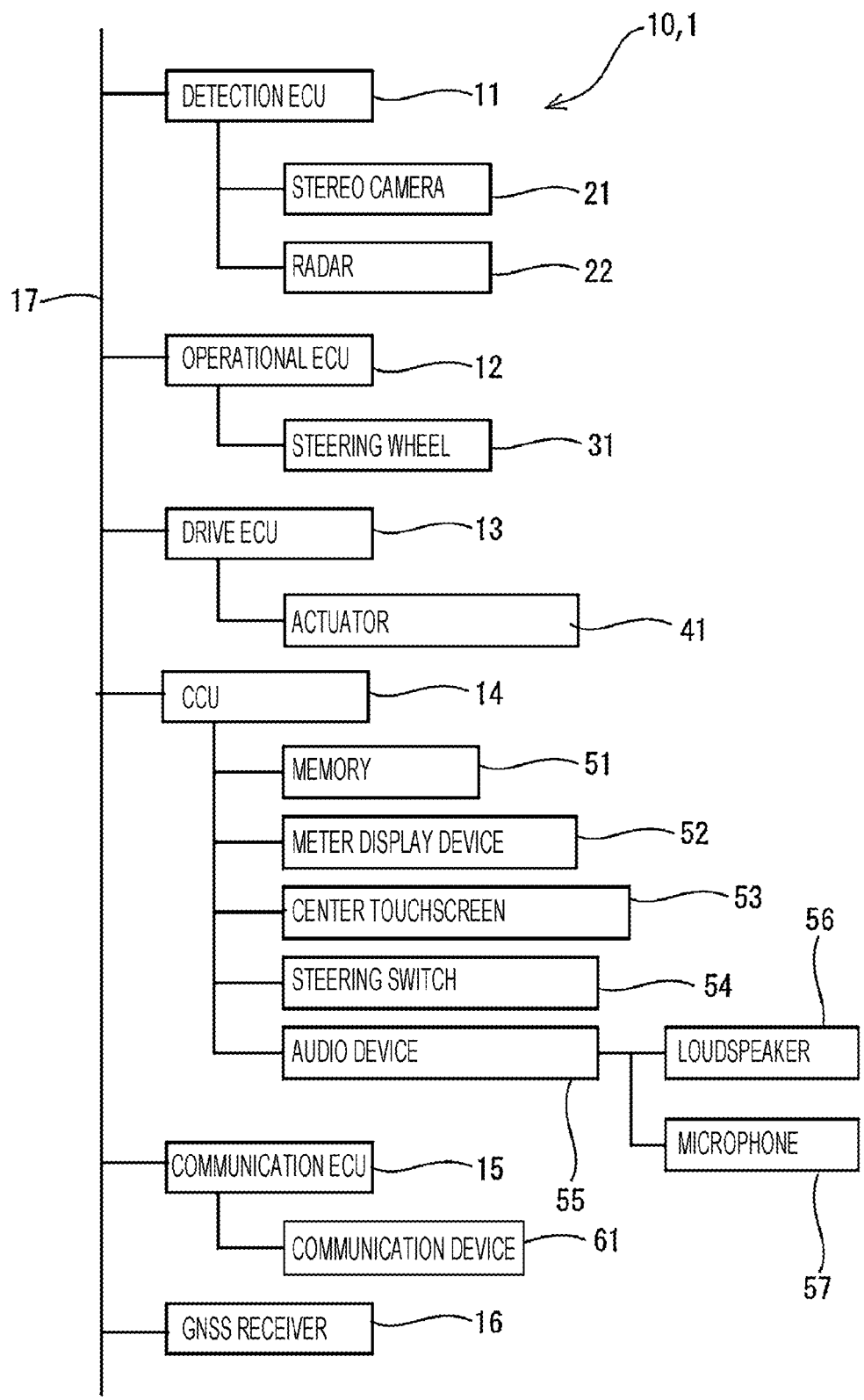
FIG. 2 illustrates a control system that can serve as the travel-environment display apparatus in the automobile in FIG. 1.

FIG. 2 illustrates a control system 10 that can serve as the travel-environment display apparatus in the automobile 1 in FIG. 1.

The control system 10 of the automobile 1 in FIG. 2 has a plurality of control ECUs for controlling the automobile 1. For example, the plurality of control ECUs include a detection ECU 11, an operational ECU 12, a drive ECU 13, a cockpit control unit (CCU) 14 as a control ECU for controlling the display of a plurality of display devices, and a communication ECU 15. The control system 10 of the automobile 1 may include other control ECUs that are not illustrated. Furthermore, each control ECU may be coupled to, for example, a memory (not illustrated) that stores a program to be executed and data to be used by the control ECU. Each control ECU loads and executes the program stored in the memory to execute control.

The plurality of control ECUs are coupled to a vehicle network 17, such as any one of a controller area network (CAN), a local interconnect network (LIN), a local area network (LAN), FlexRay, and Clock Extension Peripheral Interface (CXPI), used in the automobile 1. The vehicle network 17 may be constituted of, for example, a plurality of bus cables coupled to the plurality of control ECUs and a central gateway (CGW) serving as a relay device to which the plurality of bus cables are coupled. The plurality of control ECUs can exchange messages with one another via the vehicle network 17. Accordingly, the plurality of control ECUs operate in cooperation with one another to control the automobile 1.

The vehicle network 17 in FIG. 2 is coupled to a global navigation satellite system (GNSS) receiver 16. The GNSS receiver 16 receives a radio wave from the GNSS, generates a message containing information, such as the current location of the automobile 1 and the current time point, and outputs the message to the vehicle network 17.

The detection ECU 11 is coupled to various detectors that detect the status of the automobile 1. In FIG. 2, a stereo camera 21 and a radar 22 are illustrated as the detectors. The detection ECU 11 outputs, for example, detection values of the detectors and information based on the detection values to the vehicle network 17.

The stereo camera 21 has, for example, a plurality of cameras provided facing forward from the automobile 1. For example, the plurality of cameras may be disposed side-by-side in the vehicle width direction of the automobile 1. In this case, the plurality of cameras capture an image forward of the automobile 1. Such an image is indicated as an imaging range in FIG. 1. The detection ECU 11 may analyze the captured image and generate information about the traveling conditions of the automobile 1. For example, if the detection ECU 11 can analyze the captured image and extract a characteristic of the automobile 1, the detection ECU 11 may generate information about another automobile. For example, if the detection ECU 11 can analyze the captured image and extract a characteristic of lane boundary lines, the detection ECU 11 may generate information about the lane boundary lines. Based on a difference in imaging positions of subjects, such as another automobile, lane boundary lines, and so on, captured at different positions in the captured image of both cameras, the detection ECU 11 may calculate the relative direction and distance of the subjects from the automobile 1 trigonometrically based on the disposition of the plurality of cameras. Based on information about the imaging range of each subject in the captured image, the detection ECU 11 may estimate, for example, the type and the size of the subject. When the detection ECU 11 acquires, for example, the captured image including the lane boundary lines of the road on which the automobile 1 is traveling, the detection ECU 11 may estimate the shape and the width of the lane or road on which the automobile 1 is traveling based on the characteristic of the lane boundary lines.

The radar 22 has, for example, a plurality of ultrasonic sensors provided facing the surrounding area of the automobile 1 from the automobile 1. As illustrated in FIG. 1, the plurality of ultrasonic sensors may two-dimensionally or three-dimensionally detect four detection ranges, namely, a detection range centered on the rightward-forward direction from the automobile 1, a detection range centered on the leftward-forward direction from the automobile 1, a detection range centered on the rightward-rearward direction from the automobile 1, and a detection range centered on the leftward-rearward direction from the automobile 1. The four detection ranges in FIG. 1 cover 360° around the automobile 1. The detection ECU 11 may estimate an object existing around the automobile 1 from the detection patterns of the plurality of ultrasonic sensors serving as the radar 22. For example, a detection pattern that continues to exist in a fixed direction around the traveling automobile 1 may be estimated as a detection pattern of an object moving in the same direction as the automobile 1. The detection ECU 11 may calculate the distance to the object based on a period from transmission to reception of an ultrasonic wave when the detection pattern is detected.

Furthermore, the detection ECU 11 may integrate information obtained from these detectors to generate information about the traveling conditions of the automobile 1, such as information about an object serving as another automobile existing around the automobile 1, information about the lane boundary lines, information about the lane, and information about the road. The detection ECU 11 may generate, for example, the direction and the distance to a subject image-captured by the stereo camera 21 based on the detection information of the radar 22. The detection ECU 11 may further determine the traveling conditions of the automobile 1 based on the detection values of the detectors, such as whether the automobile 1 is traveling in the central area of the travel lane, whether the automobile 1 is traveling lopsidedly near the right edge of the travel lane, or whether the automobile 1 is traveling lopsidedly near the left edge of the travel lane, and may output information about the traveling conditions of the automobile 1 serving as the determination result to the vehicle network 17. In this case, the detection ECU 11 can serve as an acquiring unit in the control system 10 of the automobile 1.

The operational ECU 12 is coupled to various operational devices to be operated by a vehicle occupant in the automobile 1. FIG. 2 illustrates a steering wheel 31 as one of the operational devices. Other examples of the operational devices include an accelerator pedal, a brake pedal, a parking brake lever, and a turn signal lever to be operated by the vehicle occupant when the automobile 1 is to change to a left or right lane or is to turn left or right. When the turn signal lever is operated, either one of the left and right turn signal lamps of the automobile 1 blinks. The vehicle occupant holds and operates the steering wheel 31 by using both hands, so as to maintain or change the traveling direction of the automobile 1. The automobile 1 basically changes the traveling direction based on a steering angle input as a result of the vehicle occupant operating the steering wheel 31. When the vehicle occupant operates an operational device, such as the steering wheel 31, the operational ECU 12 outputs, for example, an operational value of the operational device and information based on the operational value to the vehicle network 17. For example, when the steering wheel 31 is rotated rightward, the operational ECU 12 outputs information about the rightward operational direction and the operational amount of the steering wheel 31 to the vehicle network 17.

The drive ECU 13 serves as a controller that controls the traveling of the automobile 1. The drive ECU 13 is coupled to a plurality of actuators 41, including an actuator that controls the steering of the automobile 1, an actuator that controls the acceleration of the automobile 1, and an actuator that controls the braking of the automobile 1. The drive ECU 13 acquires information from another control ECU provided in the automobile 1 and controls the operation of these actuators 41, thereby controlling the traveling of the automobile 1.

In addition to controlling the movement of the automobile 1 based on, for example, information about a vehicle occupant's operation acquired from the operational ECU 12, the drive ECU 13 may execute driving support control by acquiring information obtained from the detection ECU 11 and related to the traveling condition on the lane on which the automobile 1 is traveling, and adjusting the information about the vehicle occupant's operation in accordance with the acquired information.

Together with information acquired by the communication ECU 15 and related to an automated driving path and a travelable range, the drive ECU 13 may acquire the information obtained from the detection ECU 11 and related to the traveling condition on the lane on which the automobile 1 is traveling, so as to execute automated driving control of the automobile 1.

The drive ECU 13 outputs either one of information about the driving support control status and information about the automated driving control status to the vehicle network 17.

The communication ECU 15 is coupled to a communication device 61. The communication device 61 establishes a communication path with, for example, a communication device of another automobile, a base station, and a portable terminal. By using the communication path established by the communication device 61, the communication ECU 15 communicates and exchanges information with, for example, a server that assists in the traveling and the automated driving of the automobile 1. The communication ECU 15 acquires, from another control ECU via the vehicle network 17, information to be transmitted, and transmits the information to the server. The communication ECU 15 outputs information received from the server to another control ECU via the vehicle network 17. Information to be received by the communication ECU 15 includes, for example, information about an automated driving path and a travelable range of the automobile 1.

The CCU 14 controls, for example, the display of the plurality of display devices provided in the automobile 1 so as to cause the plurality of display devices to display information about various kinds of statuses in the automobile 1. FIG. 2 illustrates a meter display device 52 and a center touchscreen 53 as the display devices.

The meter display device 52 may be a display panel, such as a liquid crystal panel.

The center touchscreen 53 may be formed by laminating a transparent touch-sensitive panel over a display panel, such as a liquid crystal panel, so long as the center touchscreen 53 can detect an operation performed on the display by the vehicle occupant.

Examples of status information of the automobile 1 include information about the traveling conditions of the automobile 1, information about the operational status of each device of the automobile 1, information about the operational status of an air conditioner used in the automobile 1, the operational status of an audio visual device, such as an audio device 55, and the operational statuses of other equipment, information about the settings of these devices and equipment, and information related to communication. If the automobile 1 is capable of traveling in either one of a driving support mode and an automated driving mode, information about the operational status of either of the driving support function and the automated driving function, information about the recognition status by either of the driving support function and the automated driving function, and information about the details of control based on either of the driving support function and the automated driving function may be included. Examples of the driving support function and the automated driving function include a lane keep function, a tracking function for following the leading vehicle 100, a maximum-speed control function, and a lane change control function.

Such a CCU 14 serves as a generating unit that repeatedly generates a travel-environment image of the automobile 1. For example, the CCU 14 may acquire various kinds of information detected in the automobile 1, generate a travel-environment image 76 depicting a surrounding area of the automobile 1, and display the travel-environment image 76 on the meter display device 52.

Furthermore, the CCU 14 may acquire various kinds of latest information detected in the automobile 1, repeatedly generate the travel-environment image 76 depicting the surrounding area of the automobile 1, and update the display of the meter display device 52.

The CCU 14 may acquire information from each unit of the automobile 1, generate a display element according to the acquired information, generate a display screen in which a plurality of display elements are laid out, and cause each display device to display the display screen.

For example, the CCU 14 may cause the center touchscreen 53 to display information about map data and generate a route to a destination based on an operation performed on the center touchscreen 53 by the vehicle occupant.

Furthermore, while the automobile 1 is traveling, the CCU 14 may cause either one of the meter display device 52 and the center touchscreen 53 to display information about route guidance to the destination and information about the road conditions ahead from the current location acquired by the GNSS receiver 16.

Moreover, while the automobile 1 is traveling, the CCU 14 may output a path based on the generated route to the drive ECU 13 as information about a path to be used for automated driving.

In addition to the plurality of display devices, the CCU 14 in FIG. 2 is coupled to a memory 51, a steering switch 54, and the audio device 55.

The memory 51 stores a program to be executed and data to be used by the CCU 14. The CCU 14 loads and executes the program stored in the memory 51 to serve as a controller.

The steering switch 54 is a physical switch that is provided in the steering wheel 31 and that detects an operation performed by the vehicle occupant. The steering switch 54 may be provided in the steering wheel 31 such that, for example, the vehicle occupant holding the steering wheel 31 with his/her hands can reach the steering switch 54 with a finger while holding the steering wheel 31. Accordingly, the driver can operate the steering switch 54 by simply moving a finger of the hand holding the steering wheel 31 without visually checking the location of the steering switch 54.

The audio device 55 reproduces, for example, various kinds of audio data and outputs the audio data from a loudspeaker 56. The audio data may contain, for example, the status of either of the driving support function and the automated driving function, and guidance for changing or terminating driving control. The audio device 55 may output, to the CCU 14, displayable information about the audio data to be reproduced. Moreover, the audio device 55 acquires a sound, such as the vehicle-occupant's voice, collected from a microphone 57, and outputs the sound to the CCU 14. The audio device 55 may analyze the collected sound and output a command corresponding to the analyzed sound to the CCU 14.

FIG. 3 illustrates a visual field of the driver driving the automobile 1.

As illustrated in FIG. 3, the meter display device 52 is disposed in front of the driver and at the right side of a dashboard of the automobile 1. The steering wheel 31 to be operated by the driver is disposed such as to be located between the meter display device 52 and the driver. The steering wheel 31 is provided with the steering switch 54.

A monitor lamp 58 that displays the status of either of the driving support function and the automated driving function in a simplified manner is disposed in an upper area of the dashboard above the meter display device 52.

The center touchscreen 53 is disposed in a central area of the dashboard of the automobile 1.

The driver checks these display devices or checks the conditions of the road and the leading vehicle 100 visually recognizable through the windshield, so as to ascertain the conditions surrounding the automobile 1 and maneuver the automobile 1 accordingly. In the visual field through the windscreen in FIG. 3, the vehicle occupant, such as the driver, can visually recognize the left and right lane boundary lines of the lane on which the automobile 1 serving as a subject vehicle is traveling, as well as the leading vehicle 100.

The automobile 1 can travel on a path indicated by a dashed arrow in FIG. 3 by changing lanes in accordance with an operation performed by the driver or in accordance with either of the driving support function and the automated driving function.

FIG. 4 is a flowchart of a display update control process executed by the control system 10 in FIG. 2.

For example, the CCU 14 in FIG. 2 may execute the display update control process in FIG. 4 so as to repeatedly generate the display screen of the meter display device 52 serving as a display device and update the display of the meter display device 52.

The CCU 14 may serve as, for example, a generating unit that starts the control process in FIG. 4 based on an operation performed on an ignition switch (not illustrated) of the automobile 1.

In step ST1, the CCU 14 acquires various kinds of information to be used for generating the display screen from various units of the automobile 1. The CCU 14 may basically acquire information to be used for generating a plurality of display screens in FIG. 4. The CCU 14 acquires information about the status of the driving support function as minimal information.

In step ST2, the CCU 14 selects a currently-displayed screen. The CCU 14 may select one display screen from a plurality of display screens displayable on the meter display device 52, and set the selected display screen as the currently-displayed screen.

In step ST3, the CCU 14 generates each display element to be displayed on the display screen. If there is a change in information of the automobile 1 corresponding to the display element, the display element is updated to a new one.

For example, if there is a change in the temperature of the engine from a state lower than a previous threshold value to a state higher than the threshold value, the CCU 14 changes the color of the display element corresponding to the engine temperature from blue to orange.

In addition, for example, if an operation for starting either of the driving support function and the automated driving function is performed, the CCU 14 updates a circle mark indicating that the driving support function is in operation from an unlit mode to a lit mode. If the lane keep function is in operation, the CCU 14 updates a lane mark indicating that the lane keep function can be started from an unlit mode to a lit mode. When the lane boundary lines can be recognized in accordance with the lane keep function, the CCU 14 updates the recognized lane boundary lines from an unlit mode to a lit mode in a schematized image depicting the recognition status according to the driving support function. When the lane boundary lines are no longer recognizable in accordance with the lane keep function, the CCU 14 updates the recognized lane boundary lines from the lit mode to the unlit mode in the schematized image depicting the recognition status according to the driving support function.

In addition, for example, the CCU 14 may generate an image of the travel environment as an ambient environment of the automobile 1.

In step ST4, the CCU 14 generates the display screen selected in step ST2. The CCU 14 generates the display screen by allocating the plurality of display elements generated in step ST3 in accordance with the disposition and the size of the selected display screen.

In step ST5, the CCU 14 outputs the display screen generated in step ST4 to the meter display device 52. Accordingly, the meter display device 52 displays the display screen selected as the currently-displayed screen. The display of the meter display device 52 is updated.

In step ST6, the CCU 14 determines whether to terminate the display of the display screen. For example, the CCU 14 may determine whether to terminate the display of the display screen based on an operation performed on the ignition switch (not illustrated) of the automobile 1. If the display of the display screen is not to be terminated, the CCU 14 returns to step ST1. In this case, the CCU 14 repeats the update of the display of the meter display device 52 in accordance with the display screen selected as the currently-displayed screen. If the display of the display screen is to be terminated, the CCU 14 ends the control process.

Figure 5A:
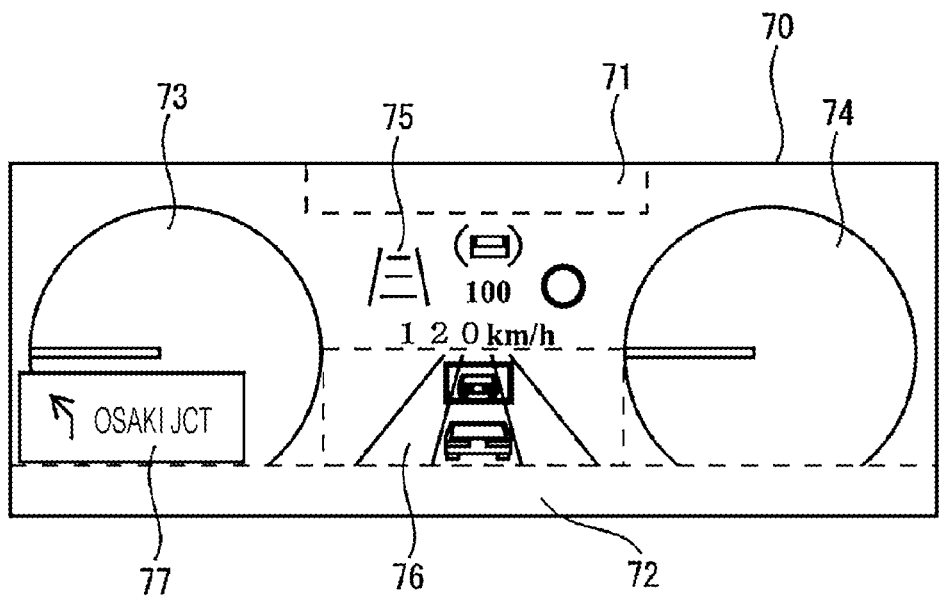
FIG. 5A and FIG. 5B illustrate a plurality of display screens displayable by switching to a meter display device in accordance with the display update control process in FIG. 4.
Figure 5B:
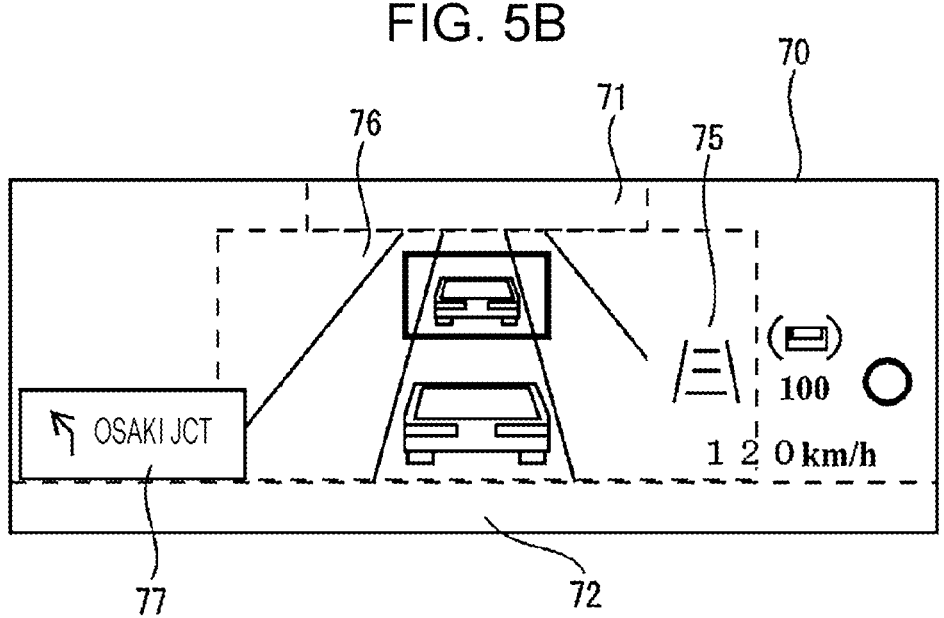

FIG. 5A and FIG. 5B illustrate a plurality of display screens displayable by switching to the meter display device 52 in accordance with the display update control process in FIG. 4.

FIG. 5A illustrates a normal display screen 70.

FIG. 5B illustrates a driving-support-prioritized display screen 70.

Each display screen 70 has an upper telltale region 71 extending in the left-right direction along the upper edge of the screen, a lower telltale region 72 extending in the left-right direction along the lower edge of the screen, a central region between the upper telltale region 71 and the lower telltale region 72, and left and right regions at the left and right sides of the central region.

The upper telltale region 71 and the lower telltale region 72 each display a plurality of display elements with respect to a plurality of pieces of basic information about the automobile 1 in a fixed layout that is shared among the plurality of display screens 70. The basic information about the automobile 1 may contain information displayed using various warning lamps in the automobile 1 in the related art. The shape and color of the display element corresponding to each piece of basic information may be changed in accordance with the content of the basic information. For example, if a warning is not to be provided, the color of the display element may be the same as the background color of the display screen 70, whereas if a warning is to be provided, the display element may be given a highly-chromatic color different from the background color of the display screen 70.

The display elements allocated to the central region, the right region, and the left region of each display screen 70 vary from display screen to display screen.

The central region of the normal display screen 70 in FIG. 5A displays a plurality of display elements 75 with respect to information about the status of either of the driving support function and the automated driving function, as well as the travel-environment image 76 of the automobile 1. The travel-environment image 76 of the automobile 1 may be a schematized image depicting the lane boundary lines of the road on which the automobile 1 is traveling during, for example, either of the driving support function and the automated driving function and the recognition status of a nearby vehicle, such as the leading vehicle 100. The right region displays an image 74 of a speed meter indicating the latest vehicle speed. The left region displays an image 73 of a tachometer indicating the latest engine rotation speed. A window region 77 is displayed in a lower area of the left region. The window region 77 displays, for example, information about the traveling direction at the next turning point and information about a music track being played.

The central region of the driving-support-prioritized display screen 70 in FIG. 5B displays the travel-environment image 76 of the automobile 1. The right region displays the plurality of display elements 75 with respect to information about the status of either of the driving support function and the automated driving function. The left region displays the window region 77 alone.

The CCU 14 may select one of the plurality of display screens 70 including those in FIG. 5A and FIG. 5B, generate the selected display screen based on latest information that can be acquired in the automobile 1, and display the generated display screen on the meter display device 52 serving as a display device.

The CCU 14 may newly select one display screen from the plurality of display screens 70 based on an operation performed on either one of the steering switch 54 and the center touchscreen 53, generate the newly-selected display screen, and display the generated display screen on the meter display device 52.

Figure 6:
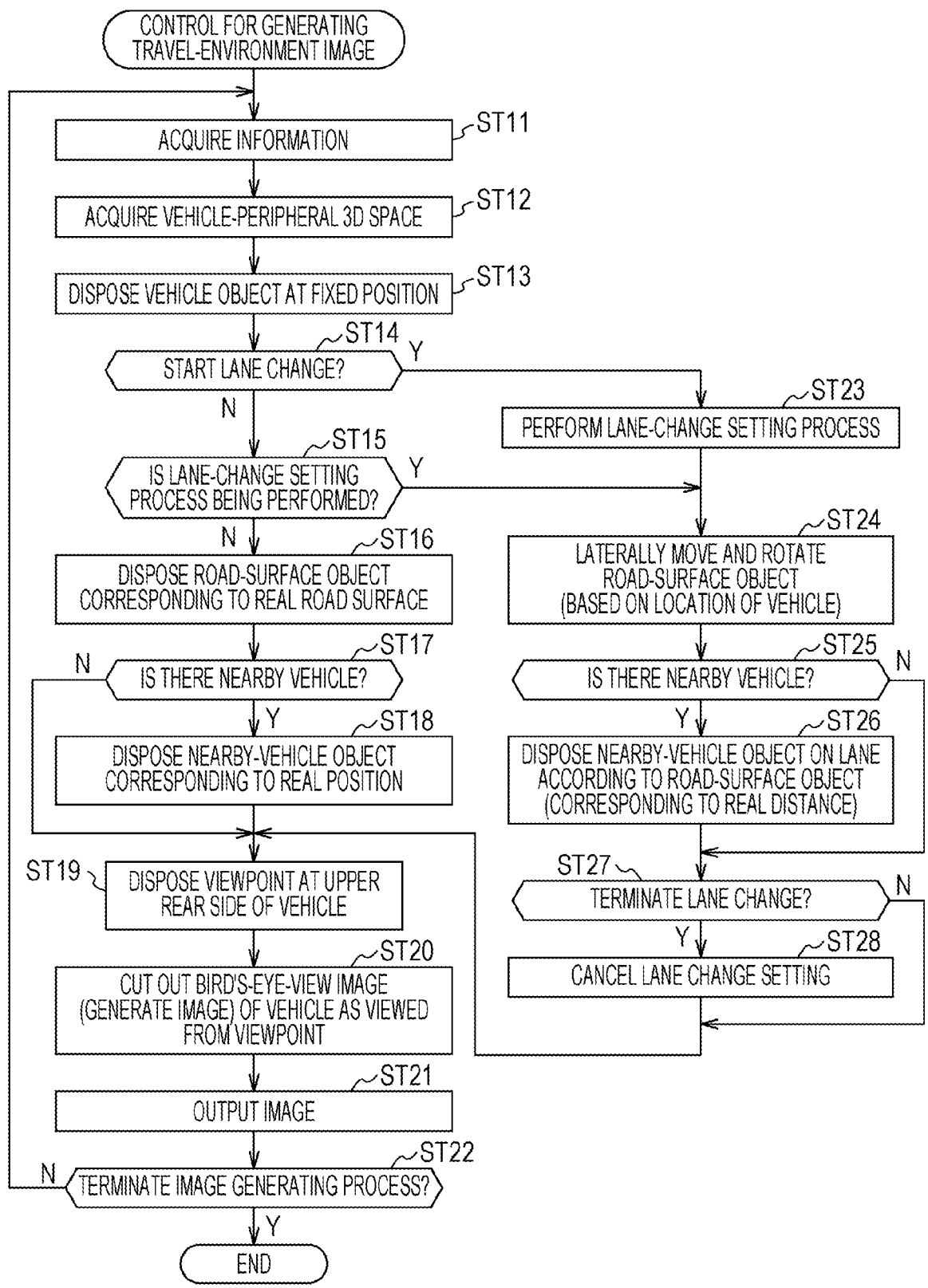
FIG. 6 is a flowchart of a control process to be executed by the control system in FIG. 2 for generating a travel-environment image.

FIG. 6 is a flowchart of a control process to be executed by the control system 10 in FIG. 2 for generating the travel-environment image 76.

For example, the CCU 14 in FIG. 2 may execute the control process for generating the travel-environment image 76 in FIG. 6 as a part of the display update control process in FIG. 4 or in addition to the display update control process in FIG. 4.

In this case, the CCU 14 serves as a generating unit that repeatedly generates the display screen on the meter display device 52 serving as a display device and that updates the display of the meter display device 52.

In step ST11, the CCU 14 acquires information from each unit of the automobile 1 to generate the travel-environment image 76.

In step ST12, the CCU 14 acquires a vehicle-peripheral three-dimensional space 80 for generating the travel-environment image 76. If a storage area for the vehicle-peripheral three-dimensional space 80 is ensured in advance, the CCU 14 may delete and reset object data of the vehicle-peripheral three-dimensional space 80 so as to acquire a new vehicle-peripheral three-dimensional space 80.

In step ST13, the CCU 14 disposes a vehicle object 81 corresponding to the automobile 1 serving as a subject vehicle in the vehicle-peripheral three-dimensional space 80. The vehicle object 81 is disposed at a predetermined fixed position in the vehicle-peripheral three-dimensional space 80. The fixed position of the vehicle object 81 in the vehicle-peripheral three-dimensional space 80 is to serve as a coordinate location to be obtained by, for example, the GNSS receiver 16 in the real space in which the automobile 1 is traveling.

In step ST14, the CCU 14 determines whether the automobile 1 is to start changing lanes in the real space. The CCU 14 may determine whether the automobile 1 is to start changing lanes in the real space based on, for example, information about the operating status (i.e., start, in-progress, or finished) of lane change control contained in the information about the control status of either of the driving support function and the automated driving function of the automobile 1 or based on information about an operation performed on the turn signal lever during manual driving. If the automobile 1 is to start changing lanes in the real space, the CCU 14 proceeds to step ST23 to generate a travel-environment image 76 corresponding to the lane change. If the automobile 1 is not to start changing lanes in the real space, the CCU 14 proceeds to step ST15.

In step ST15, the CCU 14 determines whether a lane change setting configured when a travel-environment image 76 corresponding to the lane change is to be generated is being set. The CCU 14 repeats the control in FIG. 6 from step ST11 multiple times to display the movement in the lane change, so as to repeatedly generate a plurality of travel-environment images 76. During this control period, the CCU 14 performs a lane-change setting process. The lane change setting may be stored in, for example, the memory 51 coupled to the CCU 14. The CCU 14 may load the lane change setting from the memory 51 and determine whether the lane change setting is being set. If the lane change setting is being set, the CCU 14 proceeds to step ST24 to continue generating a travel-environment image 76 corresponding to the lane change. If the lane change setting is not being set, the CCU 14 proceeds to step ST16 to generate a travel-environment image 76 that sophisticatedly corresponds to the travel environment in the real space.

From step ST16, the CCU 14 starts a process for generating a vehicle-peripheral three-dimensional space 80 that sophisticatedly corresponds to the travel environment in the real space. First, the CCU 14 disposes a road-surface object imitating the real road surface in the vehicle-peripheral three-dimensional space 80. The road-surface object may include, for example, linear road-surface objects 82 corresponding to lane boundary lines that define a lane of a road. In this case, for example, the CCU 14 analyzes a captured image of the detectors provided in the automobile 1, extracts the road, the travel lane, and the lane boundary lines on the real road surface, and identifies the vehicle-location-based relative positions of the road, the travel lane, and the lane boundary lines on the real road surface. The CCU 14 disposes the linear road-surface objects 82 corresponding to the lane boundary lines with reference to the vehicle object 81 such that the linear road-surface objects 82 correspond to the identified vehicle-location-based relative positions.

If information about the road, the travel lane, and the lane boundary lines is not appropriately obtainable from the real space, the CCU 14 may obtain the lane boundary lines based on, for example, information about the road and lane at the current location included in high-resolution three-dimensional map data instead of the lane boundary lines obtained from the real space, and dispose the linear road-surface objects 82.

In step ST17, the CCU 14 determines whether there is another automobile, that is, a nearby vehicle, around the automobile 1 in the travel environment in the real space. For example, the CCU 14 may analyze the captured image of the detectors provided in the automobile 1 and identify the leading vehicle 100, a following vehicle, and/or a parallel-running vehicle or an oncoming vehicle on a neighboring lane in the real space. The identification of a nearby vehicle in the real space may be executed by, for example, the detection ECU 11. In this case, the CCU 14 acquires information about the identification result of the nearby vehicle in the real space from, for example, the detection ECU 11. If another automobile exists around the automobile 1 in the travel environment in the real space, the CCU 14 determines that there is a nearby vehicle and proceeds to step ST18. If there is not even a single automobile around the automobile 1 in the travel environment in the real space, the CCU 14 determines that there is no nearby vehicle and proceeds to step ST19 by skipping step ST18.

In step ST18, the CCU 14 disposes a nearby-vehicle object 83 corresponding to the nearby vehicle identified in the real space. The outer surface of the nearby-vehicle object 83 may have a design texture corresponding to the nearby vehicle, or may have a design according to a predetermined texture. The CCU 14 identifies the vehicle-location-based relative position of the nearby vehicle in the real space. The CCU 14 disposes the nearby-vehicle object 83 corresponding to the nearby vehicle with reference to the vehicle object 81 such that the nearby-vehicle object 83 corresponds to the identified vehicle-location-based relative position.

From step ST19, the CCU 14 finishes generating the vehicle-peripheral three-dimensional space 80 and starts generating a travel-environment image 76 based on the generated vehicle-peripheral three-dimensional space 80. The CCU 14 disposes a viewpoint in the vehicle-peripheral three-dimensional space 80. The viewpoint is disposed at the upper rear side of the vehicle object 81 corresponding to the automobile 1. The distance from the vehicle object 81 to the viewpoint, the height from the vehicle object 81 to the viewpoint, and so on may be changeable by performing a setting process. The distance from the vehicle object 81 to the viewpoint may be limited to a range in which the vehicle object 81 is easily recognizable in the travel-environment image 76. The height of the viewpoint may be set such that an angle at which the vehicle object 81 is viewed from the viewpoint is within an appropriate range between, for example, 10° and 70° inclusive. If the viewpoint is positioned too high, the travel-environment image 76 is such that, for example, the vehicle object 81 is viewed down from directly above. If the condition of the nearby vehicle around the automobile 1 is made viewable in the travel-environment image 76 depicting the vehicle object 81 from directly above, the viewpoint is to be disposed away from the vehicle object 81, thus causing the vehicle object 81 to be smaller in the travel-environment image 76. It may possibly be difficult for the vehicle occupant, such as the driver, to recognize the vehicle object 81 in the travel-environment image 76. If the viewpoint is positioned too low, the vehicle object 81 becomes too large in the travel-environment image 76. When the condition of the nearby vehicle around the vehicle object 81 is made viewable, the viewpoint is to be disposed rearward away from the vehicle object 81, thus causing the vehicle object 81 to be smaller in the travel-environment image 76. It may possibly be difficult for the vehicle occupant, such as the driver, to recognize the vehicle object 81 in the travel-environment image 76. Setting the angle at which the vehicle object 81 is to be viewed from the viewpoint in a range between 10° and 70° inclusive can give the vehicle object 81 an appropriate size in the travel-environment image 76, while generating an image that allows the conditions around the vehicle object 81 to be viewable.

In step ST20, the CCU 14 generates the travel-environment image 76 by cutting out a bird's-eye-view image of the vehicle object 81 from the viewpoint with respect to the generated vehicle-peripheral three-dimensional space 80.

In step ST21, the CCU 14 outputs the travel-environment image 76 generated as a result of the cutting process in step ST20. The CCU 14 may output the travel-environment image 76 to the memory 51 so as to cause the memory 51 to store the travel-environment image 76. In this case, the CCU 14 executing the display update control process in FIG. 4 acquires the travel-environment image 76 stored in the memory 51 as a display element and generates a display screen including the travel-environment image 76.

In step ST22, the CCU 14 determines whether to terminate the control process for generating the travel-environment image 76. The CCU 14 may determine whether to terminate the process for generating the travel-environment image 76 based on, for example, an operation performed on the ignition switch (not illustrated) of the automobile 1. If the process for generating the travel-environment image 76 is not to be terminated, the CCU 14 returns to step ST11. In this case, the CCU 14 repeats the process from step ST11 to step ST22 to repeatedly generate and output the travel-environment image 76 corresponding to the latest travel environment in the real space. The travel-environment image 76 included in the display screen of the meter display device 52 is continuously updated so as to correspond to the latest travel environment in the real space. If the process for generating the travel-environment image 76 is to be terminated, the CCU 14 ends this control process.

In the above-described process, the CCU 14 determines whether a nearby vehicle alone exists in the real space and disposes the nearby-vehicle object 83 if there is a nearby vehicle.

Alternatively, for example, the CCU 14 may determine whether another display target exists in the real space. If there is a display target, the CCU 14 may dispose an object corresponding to the display target. For example, the CCU 14 may determine whether a lane boundary line exists in the real space. If there is a lane boundary line, the CCU 14 may dispose a linear road-surface object 82 corresponding to the lane boundary line.

Furthermore, in the above-described process, the CCU 14 determines whether information detected by the automobile 1 exists. Alternatively, for example, the CCU 14 may use the determination result obtained by the drive ECU 13 for either of the driving support function and the automated driving function. In this case, the CCU 14 is to dispose objects corresponding to the lane boundary lines and the nearby vehicle recognized by the drive ECU 13 for either of the driving support function and the automated driving function in the vehicle-peripheral three-dimensional space 80. In the vehicle-peripheral three-dimensional space 80 and the travel-environment image 76 based on the vehicle-peripheral three-dimensional space 80, the status recognized by the drive ECU 13 for either of the driving support function and the automated driving function is to be reproduced.

Figure 7A:
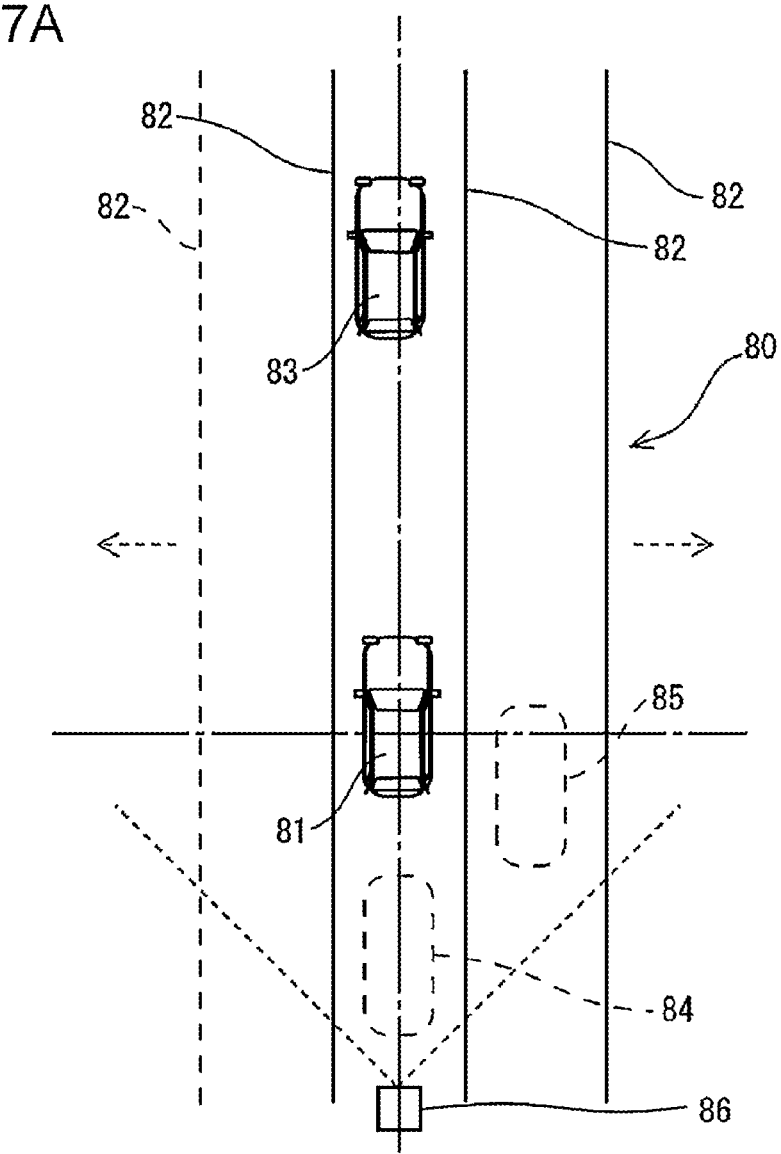
FIG. 7A and FIG. 7B illustrate a vehicle-peripheral three-dimensional space used by the control system in FIG. 2 for generating the travel-environment image, as well as the travel-environment image based on the vehicle-peripheral three-dimensional space.
Figure 7B:
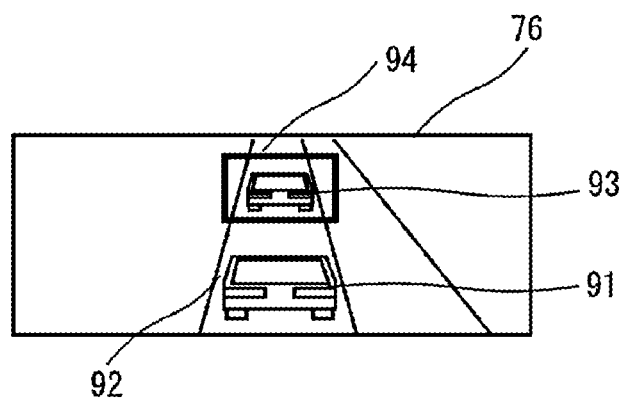

FIG. 7A and FIG. 7B illustrate the vehicle-peripheral three-dimensional space 80 used by the control system 10 in FIG. 2 for generating the travel-environment image 76, as well as the travel-environment image 76 based on the vehicle-peripheral three-dimensional space 80.

The vehicle-peripheral three-dimensional space 80 in FIG. 7A corresponds to the travel environment in the real space in FIG. 1. FIG. 7A illustrates the vehicle-peripheral three-dimensional space 80 as viewed down from directly above the vehicle object 81. The vehicle-peripheral three-dimensional space 80 in FIG. 7A includes the vehicle object 81 traveling upward from the lower side of the drawing, the linear road-surface objects 82 corresponding to a pair of left and right lane boundary lines and extending upward from the lower side of the drawing along the left and right sides of the vehicle object 81, and the nearby-vehicle object 83 corresponding to the leading vehicle 100 traveling ahead of the vehicle object 81. In FIG. 7A, a linear road-surface object 82 indicated with a dashed line at the left side is different from that in FIG. 1 in that the linear road-surface object 82 is to be disposed when there is a branch lane or a neighboring lane to the left of the travel lane. A dashed frame 84 indicates a nearby-vehicle object corresponding to a following vehicle and is to be disposed when there is a following vehicle. A dashed frame 85 indicates a nearby-vehicle object corresponding to either one of a parallel-running vehicle and an oncoming vehicle and is to be disposed when there is either one of a parallel-running vehicle and an oncoming vehicle on a neighboring lane. A rectangular frame 86 located directly behind the vehicle object 81 indicates a viewpoint camera. The viewpoint camera is disposed at a predetermined position located at the upper rear side of the vehicle object 81 in the vehicle-peripheral three-dimensional space 80. The viewpoint camera captures an image forward of the viewpoint camera from a predetermined position in an imaging range indicated with narrow dashed lines in FIG. 7A while having a depression angle that includes the vehicle object 81.

The travel-environment image 76 in FIG. 7B is an image of the vehicle-peripheral three-dimensional space 80 captured by the viewpoint camera. A lower central area of the travel-environment image 76 in FIG. 7B includes an image component 91 of the vehicle object 81 as viewed down from the upper rear side. An upper central area includes an image component 93 of the nearby-vehicle object 83 corresponding to the leading vehicle 100 as viewed down from the upper rear side. The image component 91 and the image component 93 are interposed between the left and right sides of an image component 92 of the linear road-surface objects 82, corresponding to the lane boundary lines for the road and the lanes, as viewed down from the upper rear side.

The nearby-vehicle object 83 in the travel-environment image 76 in FIG. 7B is surrounded by a rectangular recognition frame 94 indicating that the nearby vehicle is recognized by the drive ECU 13 for either of the driving support function and the automated driving function. If the leading vehicle 100 is not recognized, the image component 93 and the recognition frame 94 of the nearby-vehicle object 83 corresponding to the leading vehicle 100 may be removed from the image.

For example, the CCU 14 performs the process from step ST16 to step ST18 in FIG. 6 so as to generate the vehicle-peripheral three-dimensional space 80 corresponding to the travel environment in the real space, as illustrated in FIG. 7A.

The CCU 14 performs the process from step ST19 to step ST21 in FIG. 6 so as to generate the travel-environment image 76, as illustrated in FIG. 7B, based on the generated vehicle-peripheral three-dimensional space 80.

Accordingly, the CCU 14 generates, as an image of the travel environment of the automobile 1, an image including image components, namely, the vehicle object 81 as viewed from the viewpoint located behind the automobile 1 serving as a subject vehicle, the linear road-surface objects 82 at least extending upward distantly from the position of the vehicle object 81 in the image so as to correspond to the plurality of lane boundary lines of the road on which the automobile 1 is traveling, and the nearby-vehicle object 83 corresponding to the nearby vehicle existing around the automobile 1. For example, the CCU 14 may serve as a generating unit to generate the linear road-surface objects 82 having a shape corresponding to the shape of any one of the actual road, lane, and lane boundary lines acquirable and recognizable by the automobile 1 based on information about any one of the actual road, lane, and lane boundary lines acquirable by the automobile 1 based on, for example, detection of a vehicular sensor, and to generate the travel-environment image 76 of the automobile 1 by using the generated linear road-surface objects 82.

The relative positional relationship among these plurality of objects in the vehicle-peripheral three-dimensional space 80 appropriately corresponds to the actual relative positional relationship viewable from inside the automobile 1 in FIG. 3. For example, the linear road-surface objects 82 are displayed so as to extend upward and downward from the display position of the vehicle object 81 and also to extend along the left and right sides of the display position of the vehicle object 81.

Furthermore, the CCU 14 generates a display screen 70 including this travel-environment image 76 and displays the display screen 70 on the meter display device 52 serving as a display device. Accordingly, the driver of the automobile 1 can check the travel environment on the meter display device 52 disposed in front of the driver while focusing ahead in the traveling direction of the automobile 1.

In this case, in each of the repeatedly-generated travel-environment images 76 of the automobile 1, for example, the display position and the display angle of the vehicle object 81 are not changeable in the image. In the repeatedly-generated travel-environment images 76 of the automobile 1, the vehicle object 81 is fixedly displayed at the same position among the images.

Each travel-environment image 76 is a bird's-eye-view image of the vehicle object 81 as viewed down from the upper rear side of the vehicle object 81.

Therefore, the nearby-vehicle object 83 is displayed in the image while at least a part thereof is prevented from being hidden by the vehicle object 81.

Furthermore, the distance between the plurality of linear road-surface objects 82 decreases with increasing distance upward from the position of the vehicle object 81.

Instead of corresponding to the lane boundary lines, the linear road-surface objects 82 may correspond to any one of a travel lane, a neighboring lane, and a road. In this case, the linear road-surface objects 82 have a larger width. In the travel-environment image 76, the wider linear road-surface objects 82 corresponding to either one of a lane and a road decrease in width with increasing distance from the position of the vehicle object 81.

Referring back to FIG. 6, the control process performed by the CCU 14 for generating the travel-environment image 76 when the automobile 1 changes lanes will now described.

When the automobile 1 starts to change lanes, the CCU 14 checks in step ST14 that a lane change is to be started, and proceeds to step ST23 to start a process for generating the travel-environment image 76 corresponding to the lane change.

If the automobile 1 has already started changing lanes and is controlling the lane change, the CCU 14 confirms in step ST15 that the lane change is being controlled, and proceeds to step ST24 to continue generating the travel-environment image 76 corresponding to the lane change.

In step ST23, the CCU 14 performs a lane-change setting process to cause the vehicle object 81 to change lanes in the vehicle-peripheral three-dimensional space 80. For example, the CCU 14 updates a lane-change setting flag provided in the memory 51 from a normal non-lane-change value to a lane-change value.

Alternatively, for example, the CCU 14 may initialize a variable to be used for controlling the lane change of the vehicle object 81, such as either one of a variable with respect to a left or right movement amount from the lane and a variable with respect to a rotational angle.

The movement amount and the rotational angle may be, for example, a movement amount and a rotational angle relative to a reference line defined by either one of a vertical single-dot chain line and a horizontal single-dot chain line illustrated in FIG. 7A. Either one of the vertical single-dot chain line and the horizontal single-dot chain line illustrated in FIG. 7A intersects with the vehicle object 81. The horizontal single-dot chain line may be a line extending in the horizontal direction in the travel-environment image 76 captured by the viewpoint camera. The vertical single-dot chain line may be a line extending in the vertical direction in the travel-environment image 76 captured by the viewpoint camera.

The memory 51 may store a plurality of sets of movement amounts and rotational angles according to various stages of the lane change. The plurality of movement amounts may include, in the following order, no movement (i.e., zero movement amount), a movement amount equivalent to 25% of the lane width, a movement amount equivalent to 50% of the lane width, a movement amount equivalent to 75% of the lane width, and a movement amount equivalent to 100% of the lane width. For example, assuming that a rotational angle opposite from the moving direction for the lane change is a positive rotational angle, the plurality of rotational angles include, in the following order, no rotation (i.e., zero rotational angle), a rotational angle of +12°, a rotational angle of +25°, a rotational angle of +12°, and no rotation (i.e., zero rotational angle). In this case, the CCU 14 may perform initialization by setting a pointer to the first set of the movement amount and the rotational angle among the plurality of sets.

After the initialization in step ST23 or depending on the stage of the control process for generating the lane change, the CCU 14 proceeds to step ST24 to start a process for generating the vehicle-peripheral three-dimensional space 80 for the lane change at the current stage. The stage of the control process for generating the lane change may be determined based on, for example, the number of travel-environment images 76 generated for the lane change.

The CCU 14 first acquires the movement amount and the rotational angle of a road-surface object relative to the vehicle object 81 caused by the lane change at the current stage.

For example, the CCU 14 disposes the linear road-surface objects 82 corresponding to the lane boundary lines in the vehicle-peripheral three-dimensional space 80 in accordance with the acquired movement amount and rotational angle. In this case, the linear road-surface objects 82 to be disposed in the vehicle-peripheral three-dimensional space 80 may have a shape corresponding to that of the real road surface. For example, when a lane change is to be started at a timing at which the automobile 1 moves from a zone with straight lane boundary lines to a zone with curved lane boundary lines, the CCU 14 may change the linear road-surface objects 82 extending straight in the vehicle-peripheral three-dimensional space 80 to road-surface objects curved in conformity to the real road surface, and may dispose the curved road-surface objects in the vehicle-peripheral three-dimensional space 80. Accordingly, the lane boundary lines move in the lane-changing direction by the acquired movement amount relative to the vertical single-dot chain line illustrated in FIG. 7A, and is disposed in the vehicle-peripheral three-dimensional space 80 in a state where the lane boundary lines are rotated by the acquired rotational angle.

If the information about the road, the lane, and the lane boundary lines is not appropriately obtainable from the real space, the CCU 14 may obtain the lane boundary lines based on, for example, information about the road and lane at the current location included in high-resolution three-dimensional map data instead of the lane boundary lines obtained from the real space, and dispose the linear road-surface objects 82.

In step ST25, the CCU 14 determines whether there is another automobile, that is, a nearby vehicle, around the automobile 1 in the travel environment in the real space, similarly to step ST17. If there is another automobile around the automobile 1 in the travel environment in the real space, the CCU 14 determines that there is a nearby vehicle, and proceeds to step ST26. If there is not even a single automobile around the automobile 1 in the travel environment in the real space, the CCU 14 determines that there is no nearby vehicle and proceeds to step ST27 by skipping step ST26.

In step ST26, the CCU 14 disposes the nearby-vehicle object 83 corresponding to the nearby vehicle identified in the real space. The CCU 14 identifies the vehicle-location-based relative distance of the nearby vehicle in the real space. The CCU 14 disposes the nearby-vehicle object 83 at the identified vehicle-location-based relative distance on the lane on which the nearby vehicle exists in the real space. If the linear road-surface objects 82 corresponding to the lane boundary lines are disposed by being moved and rotated in the vehicle-peripheral three-dimensional space 80, the CCU 14 disposes the nearby-vehicle object 83 on the lane corresponding to the real space indicated by the moved and rotated road-surface objects.

In step ST27, the CCU 14 determines whether to terminate the lane change of the vehicle object 81 in the vehicle-peripheral three-dimensional space 80. For example, if a series of a predetermined number of travel-environment images 76 for displaying the lane change is to be generated in accordance with the current process, the CCU 14 may determine to terminate the lane change. If the CCU 14 is executing a process using the final set among the plurality of sets of movement amounts and rotational angles that are stored in the memory 51 and are to be sequentially used in accordance with the stages of the lane change, the CCU 14 may determine to terminate the lane change. When the CCU 14 determines to terminate the control of the lane change, the CCU 14 proceeds to step ST28. If the control of the lane change is not to be terminated, the CCU 14 proceeds to step ST19 by skipping step ST28.

In step ST28, the CCU 14 cancels the lane change setting. For example, the CCU 14 updates the lane-change setting flag provided in the memory 51 from the lane-change value to the normal non-lane-change value. Subsequently, the CCU 14 proceeds to step ST19.

In the process from step ST19 and onward during the lane change, the CCU 14 generates the travel-environment image 76 based on the generated vehicle-peripheral three-dimensional space 80 from the vehicle-peripheral three-dimensional space 80 and outputs the travel-environment image 76. If the CCU 14 determines in step ST22 not to terminate the image generating process, the CCU 14 determines in step ST15 that the lane change is being controlled, and executes the process from step ST24 to step ST28 again for the lane change. By repeating this process, the CCU 14 generates a series of travel-environment images 76 for changing lanes for the vehicle object 81, and outputs the travel-environment images 76.

When the CCU 14 reaches a state where it generates the series of travel-environment images 76 for changing lanes, the CCU 14 cancels the lane change setting by executing step ST27 and step ST28. Subsequently, the CCU 14 obtains determination results indicating "NO" in step ST14 and step ST15, and resumes the normal process for generating the vehicle-peripheral three-dimensional space 80 and the travel-environment image 76 based on the real space.

In the above-described process, the movement amount and the rotational angle of the linear road-surface objects 82 according to the lane change are preliminarily fixed for allowing the vehicle object 81 to change lanes in the vehicle-peripheral three-dimensional space 80. Based on a captured image of the real space, the CCU 14 may obtain the relative positional relationship (e.g., distance) and the angle between the automobile 1 and the lane boundary lines and may acquire the relative positional relationship and the angle as the movement amount and the rotational angle with respect to the disposition of the road-surface objects. In this case, it is desirable that the CCU 14 generate a plurality of travel-environment images 76 during the period in which the automobile 1 changes lanes in the real space. The CCU 14 may determine to terminate the lane change of the vehicle object 81 in step ST27 based on the fact that, for example, the automobile 1 is traveling along the central area of the lane serving as a lane change destination in the real space. In such control, the CCU 14 can still allow the vehicle object 81 to change lanes in the vehicle-peripheral three-dimensional space 80 such as to favorably correspond to the lane change in the real space.

Figure 8A:
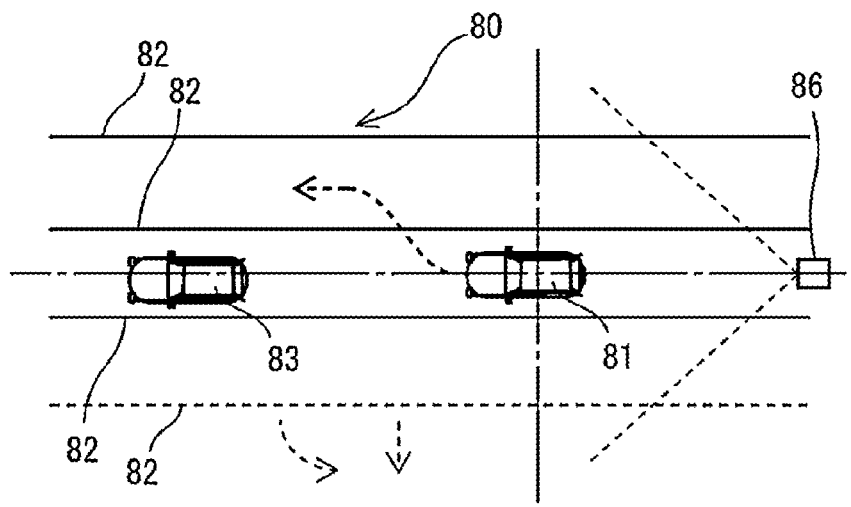
FIG. 8A to 8C illustrate a transition (i.e., first half) of the vehicle-peripheral three-dimensional space to be generated when the automobile changes lanes.
Figure 8B:
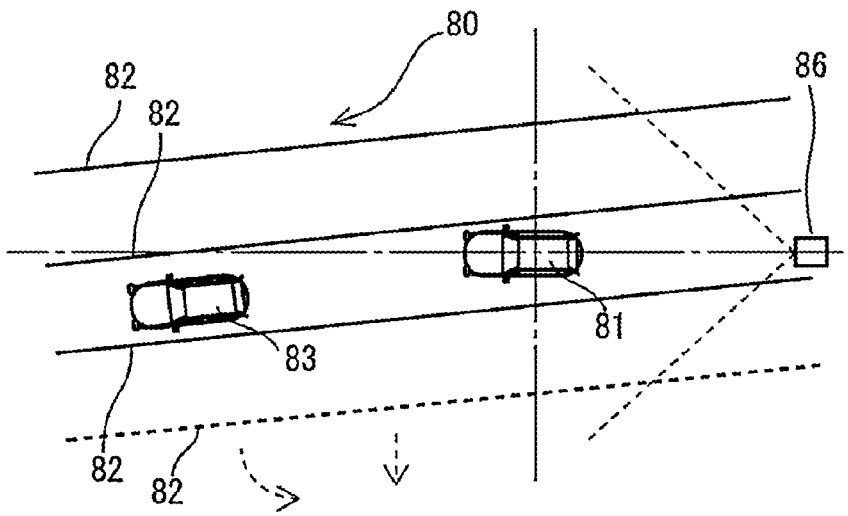
Figure 8C:
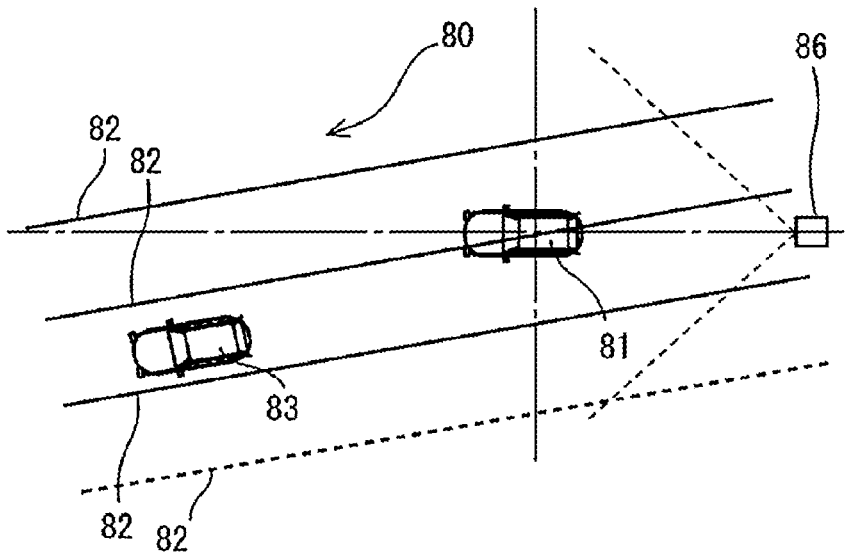

FIG. 8A to 8C illustrate a transition (i.e., first half) of the vehicle-peripheral three-dimensional space 80 to be generated when the automobile 1 changes lanes.

Figure 9A:
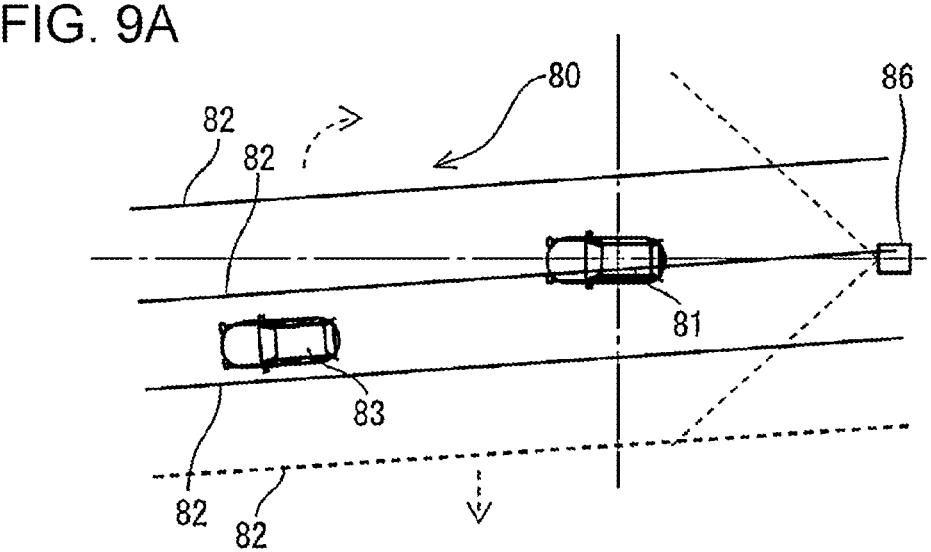
FIGS. 9A and 9B illustrate a transition (i.e., second half) of the vehicle-peripheral three-dimensional space to be generated subsequently to FIG. 8A to 8C when the automobile changes lanes.
Figure 9B:
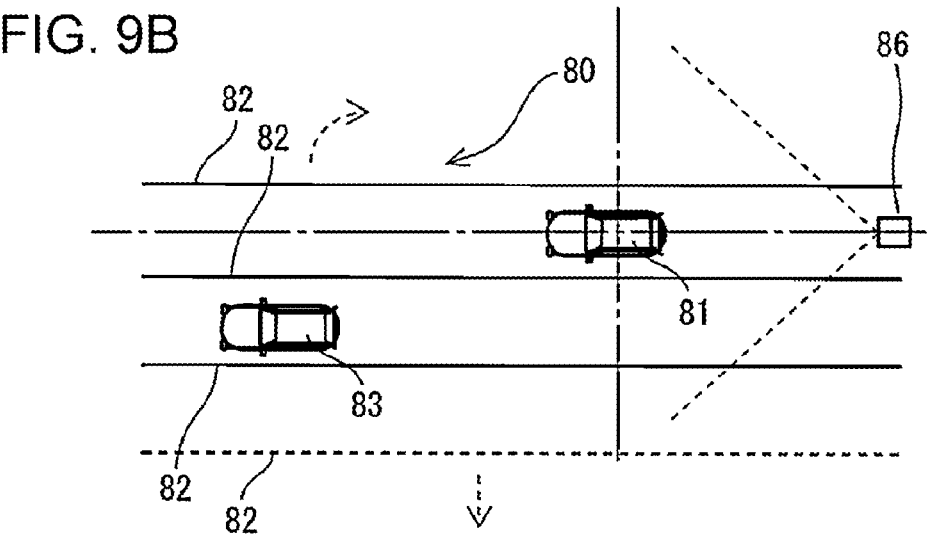

FIGS. 9A and 9B illustrate a transition (i.e., second half) of the vehicle-peripheral three-dimensional space 80 to be generated subsequently to FIG. 8A to 8C when the automobile 1 changes lanes.

In the vehicle-peripheral three-dimensional space 80 during the lane change illustrated in FIG. 8A to 9B, the vehicle object 81, the plurality of linear road-surface objects 82 corresponding to the plurality of lane boundary lines recognized on the road on which the automobile 1 is traveling, and the nearby-vehicle object 83 corresponding to the leading vehicle 100 are disposed.

FIG. 8A illustrates a first vehicle-peripheral three-dimensional space 80 generated when a lane change starts. As indicated with a dashed arrow in FIG. 8A, the vehicle object 81 changes from the current travel lane to a neighboring lane located at the right side. The plurality of linear road-surface objects 82 in FIG. 8A are disposed to move by a zero movement amount and rotate by a zero rotational angle based on, for example, a first set of movement amount and rotational angle among the plurality of sets of movement amounts and rotational angles stored in the memory 51 in accordance with the stages of the lane change.

FIG. 8B illustrates a second vehicle-peripheral three-dimensional space 80 generated subsequently to FIG. 8A during the lane change. The plurality of linear road-surface objects 82 in FIG. 8B entirely move leftward, as compared with those in FIG. 8A, and the far area at the front side in the traveling direction has rotated leftward to move leftward, as compared with the near area. The plurality of linear road-surface objects 82 in FIG. 8B are disposed to move by a movement amount equivalent to 25% of the lane width and rotate by a rotational angle of +12° based on, for example, a second set of movement amount and rotational angle among the plurality of sets of movement amounts and rotational angles stored in the memory 51 in accordance with the stages of the lane change.

FIG. 8C illustrates a third vehicle-peripheral three-dimensional space 80 generated subsequently to FIG. 8B during the lane change. The plurality of linear road-surface objects 82 in FIG. 8C entirely move leftward, as compared with those in FIG. 8B, and the far area at the front side in the traveling direction has rotated leftward to move leftward, as compared with the near area. The plurality of linear road-surface objects 82 in FIG. 8C are disposed to move by a movement amount equivalent to 50% of the lane width and rotate by a rotational angle of +25° based on, for example, a third set of movement amount and rotational angle among the plurality of sets of movement amounts and rotational angles stored in the memory 51 in accordance with the stages of the lane change.

FIG. 9A illustrates a fourth vehicle-peripheral three-dimensional space 80 generated subsequently to FIG. 8C during the lane change. The plurality of linear road-surface objects 82 in FIG. 9A entirely move leftward, as compared with those in FIG. 8C, and the far area at the front side in the traveling direction has rotated rightward to move rightward, as compared with the near area. The plurality of linear road-surface objects 82 in FIG. 9A are disposed to move by a movement amount equivalent to 75% of the lane width and rotate by a rotational angle of +12° based on, for example, a fourth set of movement amount and rotational angle among the plurality of sets of movement amounts and rotational angles stored in the memory 51 in accordance with the stages of the lane change.

FIG. 9B illustrates a fifth (i.e., final) vehicle-peripheral three-dimensional space 80 generated subsequently to FIG. 9A during the lane change. The plurality of linear road-surface objects 82 in FIG. 9B entirely move rightward, as compared with those in FIG. 9A, and the far area at the front side in the traveling direction has rotated rightward to move rightward, as compared with the near area. The plurality of linear road-surface objects 82 in FIG. 9B are disposed to move by a movement amount equivalent to 100% of the lane width and rotate by a zero rotational angle based on, for example, a fifth set of movement amount and rotational angle among the plurality of sets of movement amounts and rotational angles stored in the memory 51 in accordance with the stages of the lane change.

FIG. 10A to FIG. 10E illustrate a plurality of travel-environment images 76 generated based on the vehicle-peripheral three-dimensional spaces 80 in FIG. 8A to 9B when the automobile 1 changes lanes.

The travel-environment image 76 during the lane change illustrated in each of FIG. 10A to FIG. 10E includes the image component 91 of the vehicle object 81 included in the imaging range of the viewpoint camera, the image component 92 of the plurality of linear road-surface objects 82 corresponding to the plurality of lane boundary lines recognized on the road on which the automobile 1 is traveling, and the image component 93 of the nearby-vehicle object 83 corresponding to the leading vehicle 100.

Figure 10A:
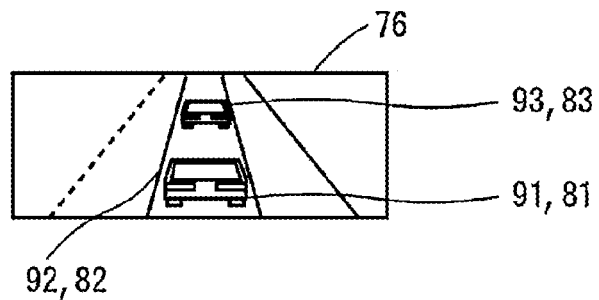
FIG. 10A to FIG. 10E illustrate a plurality of travel-environment images generated based on the vehicle-peripheral three-dimensional spaces in FIG. 8A to 9B when the automobile changes lanes.

The travel-environment image 76 in FIG. 10A is an image cut out from the first vehicle-peripheral three-dimensional space 80 in FIG. 8A.

Figure 10B:
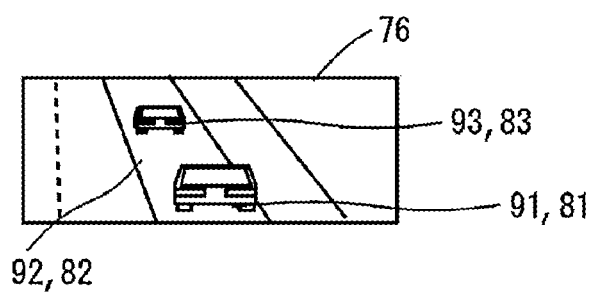

The travel-environment image 76 in FIG. 10B is an image cut out from the second vehicle-peripheral three-dimensional space 80 in FIG. 8B.

Figure 10C:
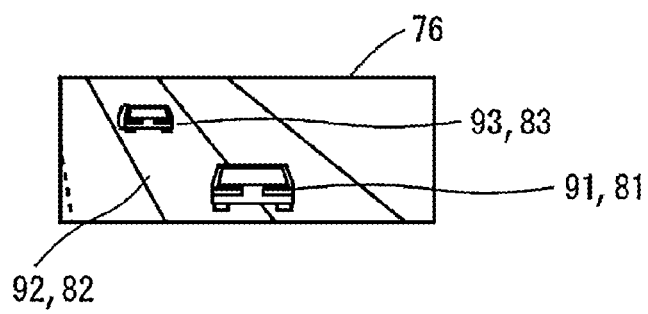

The travel-environment image 76 in FIG. 10C is an image cut out from the third vehicle-peripheral three-dimensional space 80 in FIG. 8C.

Figure 10D:
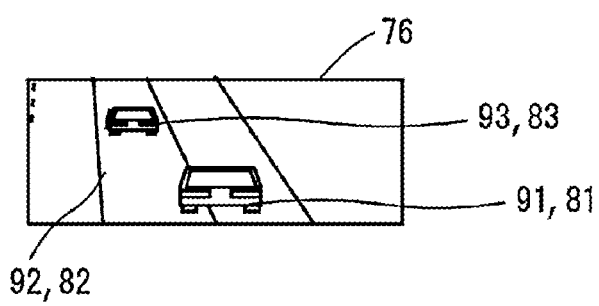

The travel-environment image 76 in FIG. 10D is an image cut out from the fourth vehicle-peripheral three-dimensional space 80 in FIG. 9A.

Figure 10E:
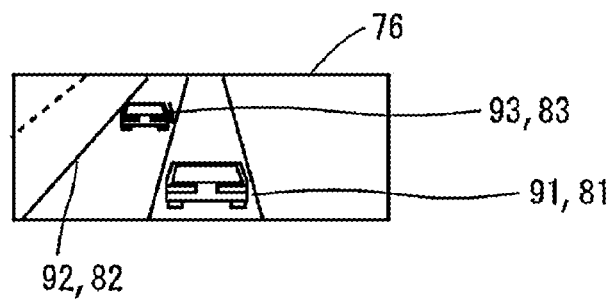

The travel-environment image 76 in FIG. 10E is an image cut out from the fifth (i.e., final) vehicle-peripheral three-dimensional space 80 in FIG. 9B.

The plurality of travel-environment images 76 generated during the lane change each include the image component 91 of the vehicle object 81 at the same fixed position among the plurality of travel-environment images 76.

The image component 92 of the plurality of linear road-surface objects 82 corresponding to the plurality of lane boundary lines moves leftward and rightward of the image in accordance with the stage of the lane change of the automobile 1, whereby the angle relative to the vertical direction of the image is changed.

The image component 93 of the nearby-vehicle object 83 corresponding to the leading vehicle 100 is disposed on a lane that moves and rotates in accordance with the stage of the lane change, such that the relative distance to the vehicle object 81 is maintained.

When the automobile 1 performs a lane change between two lanes in this manner, the image component 92 of the linear road-surface objects 82 entirely moves in the lateral direction of the image toward the opposite side from the lane-changing direction of the automobile 1 among the plurality of repeatedly and successively generated travel-environment images 76 of the automobile 1. Accordingly, the image component 91 of the vehicle object 81 appears to be moving between two lanes expressed by the image component 92 of the linear road-surface objects 82.

Furthermore, the rendering angle of the image component 92 of the linear road-surface objects 82 increases and decreases during the lane change so that the image component 92 rotates around the position of the image component 91 of the vehicle object 81. With regard to the orientation of the image component 92 of the linear road-surface objects 82, the far area from the viewpoint moves significantly toward the opposite side from the lane-changing direction of the automobile 1, as compared with the near area, and then changes back to the original orientation. In particular, in this embodiment, until the center of the image component 91 of the vehicle object 81 passes over the boundary between the two lanes expressed by the image component 92 of the linear road-surface objects 82, the image component 92 of the linear road-surface objects 82 is continuously rotated such that an upper area serving as the far area of the image component 92 of the linear road-surface objects 82 moves significantly toward the opposite side from the lane-changing direction of the automobile 1, as compared with a lower area serving as the near area. When the center of the image component 91 of the vehicle object 81 passes over the boundary between the two lanes expressed by the image component 92 of the linear road-surface objects 82, the image component 92 of the linear road-surface objects 82 is rotated back in the reverse direction so that the lateral movement amounts of the upper area serving as the far area and the lower area serving as the near area of the image component 92 of the linear road-surface objects 82 correspond to each other in the image.

When the image component 91 of the vehicle object 81 corresponding to the automobile 1 is to perform a lane change between two lanes, the image component 93 of the nearby-vehicle object 83 is not disposed at the relative position in the real space but is disposed on a lane expressed by the image component 92 of the linear road-surface objects 82 moving while changing its orientation.

The image component 93 of the nearby-vehicle object 83 included in each of the plurality of travel-environment images 76 during the lane change changes based on the disposition in the vehicle-peripheral three-dimensional space 80. In the vehicle-peripheral three-dimensional space 80, the relative direction of the nearby-vehicle object 83 with reference to the vehicle object 81 during the lane change changes in accordance with an increase and decrease in the angle of the linear road-surface objects 82. Therefore, in the image component 93 of the nearby-vehicle object 83, the side surfaces, in the rotational direction, of the far area of the linear road-surface objects 82 appear to increase and decrease from the vehicle object 81 during the lane change. A change in how the nearby-vehicle object 83 appears is expressed in the plurality of travel-environment images 76 during the lane change.

Accordingly, in this embodiment, an image generated as the travel-environment image of the automobile 1 includes the vehicle object 81 corresponding to the automobile 1 as viewed from the viewpoint behind the automobile 1, and also at least includes the linear road-surface objects 82 at least extending upward distantly from the position of the vehicle object 81 in the image corresponding to any one of the road, lane, and lane boundary lines along which the automobile 1 is traveling. Then, when the automobile 1 is to perform a lane change between two lanes, the vehicle object 81 is moved between two lanes expressed by the linear road-surface objects 82 between repeatedly and successively generated travel-environment images 76 of the automobile 1, and the orientation of the linear road-surface objects 82 is changed such that the far area of the linear road-surface objects 82 from the viewpoint moves significantly toward the opposite side from the lane-changing direction of the automobile 1, as compared with the near area, and then changes back to the original orientation.

Accordingly, the vehicle object 81 can mimic the actual movement of the automobile 1 when changing lanes diagonally relative to the previous travel lane of the automobile 1, and can change lanes diagonally relative to the lanes in the image. The vehicle object 81 changing lanes is less likely to appear as if the vehicle object 81 is slipping sideways in the image.

According to this embodiment, a vehicle occupant, such as the driver, can instantaneously and easily ascertain at a glance that the movement of the automobile 1 corresponds to a lane change in the displayed image, can instantaneously ascertain that the movement matches the actual movement of the automobile 1 for a lane change viewable outside the automobile 1, and can immediately execute an appropriate operation accordingly.

In addition, the travel-environment image 76 of the automobile 1 in this embodiment is a bird's-eye-view image of the vehicle object 81 as viewed from the upper rear side of the automobile 1. Moreover, in the travel-environment image 76 of the automobile 1 in this embodiment, the linear road-surface objects 82 respectively correspond to the plurality of lane boundary lines on the road on which the automobile 1 is traveling, and the distance between the plurality of linear road-surface objects 82 decreases with increasing distance from the position of the vehicle object 81. By displaying the plurality of linear road-surface objects 82, the image is given perspective so that an atmosphere of a bird's-eye-view image from the upper rear side of the automobile 1 can be produced. In the bird's-eye-view image of the automobile 1 and the surrounding road thereof as viewed from the upper rear side, the movement of the automobile 1 when changing lanes may tend to be visually recognized that the automobile 1 is slipping sideways between the lanes in the image, as compared with a bird's-eye-view image of the automobile 1 and the surrounding road thereof as viewed from directly above. However, in this embodiment, the image is generated in accordance with the above-described method, so that the vehicle occupant can easily recognize from the image that the movement of the automobile 1 when changing lanes corresponds to a lane change instead of side slipping.

In a case where the linear road-surface objects 82 correspond to either one of a lane and a road, the linear road-surface objects 82 are displayed such that the distance therebetween decreases with increasing distance from the position of the vehicle object 81, so that a bird's eye view can be similarly produced with respect to the image.

In this embodiment, the vehicle object 81 is fixedly displayed at the same position among the plurality of repeatedly-generated travel-environment images 76 of the automobile 1 such that the display position and the display angle do not change. Accordingly, a situation where the vehicle object 81 appears as if it skips sideways, as in a case where the vehicle object 81 positionally moves leftward and rightward during, for example, a lane change, or a situation where the vehicle object 81 moving leftward or rightward becomes non-viewable by being hidden by vehicular equipment, such as the steering wheel 31, located around or in front of the meter display device 52 serving as a display device can be prevented.

In particular, in this embodiment, the linear road-surface objects 82 are continuously rotated such that the far area of the linear road-surface objects 82 moves toward the opposite side from the lane-changing direction of the automobile 1 until the center of the vehicle object 81 passes over the boundary between the two lanes expressed by the linear road-surface objects 82. When the center of the vehicle object 81 passes over the boundary between the two lanes expressed by the linear road-surface objects 82, the linear road-surface objects 82 are rotated back in the reverse direction so that the lateral movement amounts of the far area and the near area of the linear road-surface objects 82 correspond to each other in the image. Accordingly, in the actual movement of the automobile 1 involving changing the orientation on the original lane for a lane change and then restoring the orientation on the destination lane, the image may change to appropriately comply with the movement of the scene visually recognized forward of the automobile 1 by the vehicle occupant, such as the driver. The vehicle occupant, such as the driver, may easily ascertain the movement of the vehicle object 81 in the image as the movement of a smooth lane change that corresponds to the actual lane change.

In this embodiment, the displayed travel-environment image 76 of the automobile 1 includes the nearby-vehicle object 83 corresponding to a nearby vehicle existing around the automobile 1. Examples of such a nearby vehicle include the leading vehicle 100, a following vehicle, and another automobile (e.g., either one of a parallel-running vehicle and an oncoming vehicle) on a neighboring lane.

When the automobile 1 is to perform a lane change between two lanes, the nearby-vehicle object 83 is disposed on a lane expressed by the linear road-surface objects 82 that move while changing the orientation. Accordingly, the positional relationship between the linear road-surface objects 82 and the nearby-vehicle object 83 in the image can be a positional relationship that corresponds to the scene viewable from the automobile 1 during the lane change.

In addition, in this embodiment, when the vehicle object 81 corresponding to the automobile 1 moves to change lanes, the display angle of the nearby-vehicle object 83 increases or decreases in accordance with the rotational movement amount and direction of the far area of the linear road-surface objects 82 caused by an increase or decrease in the display angle of the linear road-surface objects 82, so that the side surface of the nearby-vehicle object 83 at the moving side according to the rotation of the far area of the linear road-surface objects 82 is displayed. The orientation of the nearby-vehicle object 83 changes during the lane change. Accordingly, the image component 93 of the nearby-vehicle object 83 displayed in the travel-environment image 76 of the automobile 1 changes to correspond to how the nearby vehicle actually viewable from the automobile 1 performing the lane change appears.

Accordingly, in this embodiment, even in a state where a nearby vehicle is displayed in the travel-environment image 76 of the automobile 1, the vehicle occupant, such as the driver, can easily ascertain the movement of the vehicle object 81 in the image as the movement of a smooth lane change that corresponds to the actual lane change.

Accordingly, in this embodiment, the display of the travel-environment image 76 displayed in the automobile 1 can be improved.

Although the above embodiment is an example of a preferred embodiment of the disclosure, the embodiment of the disclosure is not to be limited to the above embodiment, and various modifications or alterations are possible so long as they do not depart from the gist of the disclosure.

The control system 10 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control system 10 including the detection ECU 11, the operational ECU 12, the drive ECU 13, the CCU 14, and the communication ECU 15. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A vehicular travel-environment display apparatus to be applied to a vehicle, the vehicular travel-environment display apparatus comprising:
   a display device configured to display image;
   one or more memories configured to store instructions; and one of more processors configured to execute the instructions to:
generate a virtual three-dimensional space including a vehicle object and a road-surface object, the vehicle object corresponding to the vehicle in a real space, the road-surface object corresponding to a lane boundary line on a road in the real space, the lane boundary line defining a boundary between a first lane and a second lane adjacent to the first lane, the second lane being located in a first direction than the first lane;
determine whether the vehicle starts to change lane from the first lane to the second lane in the real space; and
in response to determining that the vehicle starts to change lane, (i) generate a series of a predetermined number of travel-environment images, and (ii) output the series of the predetermined number of the travel-environment images to the display device as the image,
wherein the series of the predetermined number of the travel-environment images include:
a first image of the virtual three-dimensional space in a first state viewed from a predetermined viewpoint with a predetermined field of view including the vehicle object and the road-surface object, the predetermined viewpoint being located a predetermined distance rearward from a reference point fixed to the vehicle object and located a predetermined distance upward from the reference point, the first state is a state in which the road-surface object is located such that (i) a relative angle between a longitudinal direction of the road-surface object and a front-rear direction of the vehicle object is zero, (ii) the road-surface object is located in a second direction corresponding to the first direction in the real space than the reference point, and (iii) a separation distance between the reference point and the road-surface object is a predetermined first distance;
a second image of the virtual three-dimensional space in a second state viewed from the predetermined viewpoint with the predetermined field of view, the second image being generated after the first image, the second state is a state in which the road-surface object is located such that (i) the relative angle is a predetermined first angle greater than zero, (ii) the road-surface object is located in the second direction than the reference point, and (iii) the separation distance is a predetermined second distance less than the predetermined first distance;
a third image of the virtual three-dimensional space in a third state viewed from the predetermined viewpoint with the predetermined field of view, the third image being generated after the second image, the third state is a state in which the road-surface object is located such that (i) the relative angle is a predetermined second angle greater than the predetermined first angle, and (ii) the predetermined reference point is located on the road-surface object;
a fourth image of the virtual three-dimensional space in a fourth state viewed from the predetermined viewpoint with the predetermined field of view, the fourth image being generated after the third image, the fourth state is a state in which the road-surface object is located such that (i) the relative angle is a predetermined third angle less than the predetermined second angle and greater than zero, (ii) the road-surface object is located in a third direction opposite to the second direction than the reference point, and (iii) the separation distance is a predetermined third distance greater than zero; and
a fifth image of the virtual three-dimensional space in a fifth state viewed from the predetermined viewpoint with the predetermined field of view, the fifth image being generated after the fourth image, the fourth state is a state in which the road-surface object is located such that (i) the relative angle is zero, (ii) the road-surface object is located in the third direction than the reference point, and (iii) the separation distance is a predetermined fourth distance greater than the predetermined third distance.

2. The vehicular travel-environment display apparatus according to claim 1,
wherein the one of more processors configured to execute the instructions to
generate the road-surface object with a shape corresponding to any one of the road and the lane boundary line acquirable by the vehicle based on information about any one of the road and the lane boundary line acquirable by the vehicle.

3. The vehicular travel-environment display apparatus according to claim 1,
wherein in each of the series of the predetermined number of the travel environment images, a position and an angle of the vehicle object are fixed.

4. The vehicular travel-environment display apparatus according to claim 1,
wherein the one of more processors are configured to execute the instructions to:
generate a nearby-vehicle object in the virtual three-dimensional space corresponding to a nearby vehicle in the real space identified by a sensor of the vehicle;
place the nearby-vehicle object in the virtual three-dimensional space at a position corresponding to a position relative to the vehicle in the real space; and
include the nearby-vehicle object in the series of the predetermined number of the travel-environment images.

5. A vehicular travel-environment display apparatus to be applied to a vehicle, the vehicular travel-environment display apparatus comprising:
circuitry configured to
generate a virtual three-dimensional space including a vehicle object and a road-surface object, the vehicle object corresponding to the vehicle in a real space, the road-surface object corresponding to a lane boundary line on a road in the real space, the lane boundary line defining a boundary between a first lane and a second lane adjacent to the first lane, the second lane being located in a first direction than the first lane;
determine whether the vehicle starts to change lane from the first lane to the second lane in the real space; and
in response to determining that the vehicle starts to change lane, (i) generate a series of a predetermined number of travel-environment images, and (ii) output the series of the predetermined number of the travel-environment images to a display device of the vehicle,
wherein the series of the predetermined number of the travel-environment images include:
a first image of the virtual three-dimensional space in a first state viewed from a predetermined viewpoint with a predetermined field of view including the vehicle object and the road-surface object, the predetermined viewpoint being located a predetermined distance rearward from a reference point fixed to the vehicle object and located a predetermined distance upward from the reference point, the first state is a state in which the road-surface object is located such that (i) a relative angle between a longitudinal direction of the road-surface object and a front-rear direction of the vehicle object is zero, (ii) the road-surface object is located in a second direction corresponding to the first direction in the real space than the reference point, and (iii) a separation distance between the reference point and the road-surface object is a predetermined first distance;

a second image of the virtual three-dimensional space in a second state viewed from the predetermined viewpoint with the predetermined field of view, the second image being generated after the first image, the second state is a state in which the road-surface object is located such that (i) the relative angle is a predetermined first angle greater than zero, (ii) the road-surface object is located in the second direction than the reference point, and (iii) the separation distance is a predetermined second distance less than the predetermined first distance;

a third image of the virtual three-dimensional space in a third state viewed from the predetermined viewpoint with the predetermined field of view, the third image being generated after the second image, the third state is a state in which the road-surface object is located such that (i) the relative angle is a predetermined second angle greater than the predetermined first angle, and (ii) the predetermined reference point is located on the road-surface object;

a fourth image of the virtual three-dimensional space in a fourth state viewed from the predetermined viewpoint with the predetermined field of view, the fourth image being generated after the third image, the fourth state is a state in which the road-surface object is located such that (i) the relative angle is a predetermined third angle less than the predetermined second angle, (ii) the road-surface object is located in a third direction opposite to the second direction than the reference point, and (iii) the separation distance is a predetermined third distance greater than zero; and a fifth image of the virtual three-dimensional space in a fifth state viewed from the predetermined viewpoint with the predetermined field of view, the fifth image being generated after the fourth image, the fourth state is a state in which the road-surface object is located such that (i) the relative angle is zero, (ii) the road-surface object is located in the third direction than the reference point, and (iii) the separation distance is a predetermined fourth distance greater than the predetermined third distance.

6. The vehicular travel-environment display apparatus according to claim 5,
wherein in each of the series of the predetermined number of the travel environment images, a position and an angle of the vehicle object are fixed.

7. The vehicular travel-environment display apparatus according to claim 5,
wherein the circuitry is configured to:
generate a nearby-vehicle object in the virtual three-dimensional space corresponding to a nearby vehicle in the real space identified by a sensor of the vehicle;
place the nearby-vehicle object in the virtual three-dimensional space at a position corresponding to a position relative to the vehicle in the real space; and
include the nearby-vehicle object in the series of the predetermined number of the travel-environment images.

\* \* \* \* \*